(12) United States Patent
Tambuluri et al.

(10) Patent No.: US 11,743,275 B2
(45) Date of Patent: Aug. 29, 2023

(54) MACHINE LEARNING BASED ANOMALY DETECTION AND RESPONSE

(71) Applicant: Netskope, Inc., Santa Clara, CA (US)

(72) Inventors: Jeevan Tambuluri, Santa Clara, CA (US); Ravi Ithal, Los Altos, CA (US); Steve Malmskog, San Jose, CA (US); Abhay Kulkarni, Cupertino, CA (US); Ariel Faigon, Santa Clara, CA (US); Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 113 days.

(21) Appl. No.: 17/332,879

(22) Filed: May 27, 2021

(65) Prior Publication Data

US 2021/0288983 A1  Sep. 16, 2021

Related U.S. Application Data

(63) Continuation of application No. 16/389,861, filed on Apr. 19, 2019, now Pat. No. 11,025,653, which is a (Continued)

(51) Int. Cl.
*H04L 9/40* (2022.01)
*G06N 20/00* (2019.01)
(Continued)

(52) U.S. Cl.
CPC ........ *H04L 63/1416* (2013.01); *G06F 21/554* (2013.01); *G06F 21/6209* (2013.01);
(Continued)

(58) Field of Classification Search
CPC .............. H04L 63/1416; G06F 21/554; G06F 21/6209; G06N 20/00
See application file for complete search history.

(56) References Cited

U.S. PATENT DOCUMENTS 6,574,655 B1  6/2003 Libert et al.
7,743,003 B1  6/2010 Tong et al.
(Continued)

FOREIGN PATENT DOCUMENTS

JP  2012084141 A  4/2012
JP  2015130112 A  7/2015
(Continued)

OTHER PUBLICATIONS

Zhu, Xiaojin Jerry. "Semi-supervised learning literature survey." (2005). (Year: 2005).*
(Continued)

*Primary Examiner* — Robert B Leung

(57) ABSTRACT

The technology relates to machine responses to anomalies detected using machine learning based anomaly detection. In particular, to receiving evaluations of production events, prepared using activity models constructed on per-tenant and per-user basis using an online streaming machine learner that transforms an unsupervised learning problem into a supervised learning problem by fixing a target label and learning a regressor without a constant or intercept. Further, to responding to detected anomalies in near real-time streams of security-related events of tenants, the anomalies detected by transforming the events in categorized features and requiring a loss function analyzer to correlate, essentially through an origin, the categorized features with a target feature artificially labeled as a constant. An anomaly score received for a production event is determined based on calculated likelihood coefficients of categorized feature-value pairs and a prevalencist probability value of the production event comprising the coded features-value pairs.

20 Claims, 12 Drawing Sheets

Related U.S. Application Data continuation of application No. 15/256,483, filed on Sep. 2, 2016, now Pat. No. 10,270,788.

(60) Provisional application No. 62/346,382, filed on Jun. 6, 2016.

(51) Int. Cl.
  *G06F 21/55* (2013.01)
  *G06F 21/62* (2013.01)
  *G06N 5/02* (2023.01)
  *G06N 7/01* (2023.01)

(52) U.S. Cl.
  CPC ............... *G06N 5/02* (2013.01); *G06N 7/01* (2023.01); *G06N 20/00* (2019.01)

(56) References Cited

U.S. PATENT DOCUMENTS

| | | | |
|---|---|---|---|
| 7,996,373 | B1 | 8/2011 | Zoppas et al. |
| 8,127,365 | B1 | 2/2012 | Liu et al. |
| 8,130,747 | B2 | 3/2012 | Li et al. |
| 8,438,630 | B1 | 5/2013 | Clifford |
| 8,776,249 | B1 | 7/2014 | Margolin |
| 9,069,992 | B1 | 6/2015 | Vaikar et al. |
| 9,137,131 | B1 | 9/2015 | Sarukkai et al. |
| 9,185,095 | B1 | 11/2015 | Moritz et al. |
| 9,275,345 | B1 | 3/2016 | Song et al. |
| 9,338,187 | B1 | 5/2016 | Oprea et al. |
| 10,291,657 | B2 | 5/2019 | Narayanaswamy et al. |
| 10,349,304 | B2 | 7/2019 | Kim et al. |
| 10,594,730 | B1 | 3/2020 | Summers et al. |
| 10,757,090 | B2 | 8/2020 | Kahol et al. |
| 10,855,671 | B2 | 12/2020 | Kahol et al. |
| 2005/0289354 | A1 | 12/2005 | Borthakur et al. |
| 2007/0245420 | A1 | 10/2007 | Yong et al. |
| 2008/0127303 | A1 | 5/2008 | Wrighton et al. |
| 2008/0189778 | A1 | 8/2008 | Rowley |
| 2008/0216174 | A1 | 9/2008 | Vogel et al. |
| 2010/0146269 | A1 | 6/2010 | Baskaran |
| 2011/0047590 | A1 | 2/2011 | Carr et al. |
| 2011/0131408 | A1 | 6/2011 | Cook et al. |
| 2011/0276828 | A1 | 11/2011 | Tamaki et al. |
| 2012/0008786 | A1 | 1/2012 | Cronk et al. |
| 2012/0278872 | A1 | 11/2012 | Woelfel et al. |
| 2013/0254885 | A1 | 9/2013 | Devost |
| 2014/0007222 | A1 | 1/2014 | Qureshi et al. |
| 2014/0026182 | A1 | 1/2014 | Pearl et al. |
| 2014/0096249 | A1 | 4/2014 | Dupont et al. |
| 2015/0067845 | A1 | 3/2015 | Chari et al. |
| 2015/0088791 | A1* | 3/2015 | Lin ................. G06N 20/10 706/12 |
| 2015/0200924 | A1 | 7/2015 | Parla et al. |
| 2015/0286819 | A1 | 10/2015 | Coden et al. |
| 2015/0319156 | A1 | 11/2015 | Guccione et al. |
| 2016/0087970 | A1 | 3/2016 | Kahol et al. |
| 2016/0149941 | A1 | 5/2016 | Thakur et al. |
| 2016/0269467 | A1 | 9/2016 | Lee et al. |
| 2016/0277374 | A1 | 9/2016 | Reid et al. |
| 2016/0285918 | A1 | 9/2016 | Peretz et al. |
| 2016/0292445 | A1 | 10/2016 | Lindemann |
| 2017/0063720 | A1 | 3/2017 | Foskett et al. |
| 2017/0091482 | A1 | 3/2017 | Sarin et al. |
| 2017/0264640 | A1 | 9/2017 | Narayanaswamy et al. |
| 2018/0063182 | A1 | 3/2018 | Jones et al. |

FOREIGN PATENT DOCUMENTS

| | | |
|---|---|---|
| WO | 2005/069823 A2 | 8/2005 |
| WO | 2007009255 A1 | 1/2007 |
| WO | 2012058487 A2 | 5/2012 |
| WO | 2014/093613 A1 | 6/2014 |
| WO | 2019226363 A1 | 11/2019 |

OTHER PUBLICATIONS

PCT/US2019/031867—International Preliinary Report on Patentability dated Nov. 24, 2020, 12 pages.
U.S. Appl. No. 16/389,861—Response to Office Action dated Oct. 13, 2020, filed Jan. 12, 2021, 11 pages.
U.S. Appl. No. 16/389,861—Notice of Allowance dated Feb. 3, 2021, 27 pages.
Screen capture of https://www.bitglass.com/blog/how-topatent-a-phishing-attack, dated Oct. 1, 2015.
PTAB Case No. PGR2021-00091, Petition for Post-Grant Review of U.S. Pat. No. 10,855,671, *Netskope, Inc.*, Petitioner, v. *Bitglass, Inc.*, Patent Owner.
PTAB Case No. PGR2021-00092, Petition for Post-Grant Review of U.S. Pat. No. 10,855,671, *Netskope, Inc.*, Petitioner, v. *Bitglass, Inc.*, Patent Owner.
Jill Gemmill et al., Cross-domain authorization for feder-ated virtual organizations using the myVocs collaboration environment, 21 Concurrency & Computation: Prac-Tice and Experience 509 (2008).
PTAB Case No. IPR2021-01045, Petition for Inter Partes Review of U.S. Pat. No. 10,757,090, *Netskope, Inc.*, Petitioner, v. *Bitglass, Inc.*, Patent Owner.
PTAB Case No. IPR2021-01046, Petition for Inter Partes Review of U.S. Pat. No. 10,757,090, *Netskope, Inc.*, Petitioner, v. *Bitglass, Inc.*, Patent Owner.
Langford, John, "vowpal_wabbit", 2 pages, [retrieved on Aug. 24, 2016], Retrieved from the Internet<https://github.com/JohnLangford/vowpal_wabbit>.
"Liblinear—A Library for Large Linear Classification", 3 pages, [retrieved on Aug. 24, 2016], Retrieved from the Internet<https://www.csie.ntu.edu.tw/~cjlin/liblinear/>.
"LIBSVM", 2 pages, [retrieved on Aug. 24, 2016], Retrieved from the lnternet<https://en.wikipedia.org/wiki/LIBSVM>.
Sindhwani, Vikas, "SVMlin: Fast Linear SVM Solvers for Supervised and Semi-supervised Learning", 4 pages, [retrieved on Aug. 24, 2016], Retrieved from the Internet <http://vikas.sindhwani.org/svmlin.html>.
Wiki, "JohnLangford/vowpal_wabbit", 2 pages, [retrieved on Aug. 24, 2016], Retrieved from the Internet<https://github.com/JohnLangford/vowpal_wabbit/wiki>.
U.S. Appl. No. 15/256,483—Office Action dated Jul. 10, 2018, 20 pages.
"Netskope Introspection," netSkope, Inc., 2015, 3 pgs.
"Data Loss Prevention and Monitoring in the Cloud" by netSkope, Inc., Nov. 2014, 18 pgs.
"Repave the Cloud-Data Breach Collision Course," netSkope, Inc., 2014, 6 pgs.
PCT/US2017/021969—International Search Report and Written Opinion dated Jun. 22, 2017, 11 pages.
Laminin Solutions: "Metadata Permissions Protects Confidential Information", Feb. 19, 2013, pp. 1-2 XP002770913.
Yague et al., "A Metadata-based access control model for web services", Computer Science Department, Internet Research, vol. 15, No. 1, University of Malaga, Malaga, Spain, Dec. 31, 2005, pp. 99-116, XP002770914.
Gowadia etal., "RDF Metadata for XML Access Control", Proceedings of the ACM Workshop on XML Security 2003. Fairfax, VA, Oct. 31, 2003, pp. 39-48, XP001198168.
Kuwabara et al., "Use of Metadata for Access Control and Version Management in RDF Database", Sep. 12, 2011, Knowledge-Based and Intelligent Information and Engineering Systems, Springer Berling Heidelberg, pp. 326-336, XP019164752.
PCT/US2017/021969—International Preliminary Reporton Patentability dated Mar. 5, 2018, 13 pages.
U.S. Appl. No. 15/368,240—Offce Action dated Aug. 7, 2018, 28 pages.
U.S. Appl. No. 16/000,132—Offce Action dated Oct. 2, 2018, 18 pages.
U.S. Appl. No. 15/256,483—Response to Office Action dated Jul. 10, 2018, Oct. 10, 2018, filed 18 pages.
U.S. Appl. No. 15/256,483—Notice of Allowance dated Dec. 5, 2018, 46 pages.

(56) References Cited

OTHER PUBLICATIONS

Zhao, Y., et al., "Bayesian Statistical Inference in Machine Learning Anomaly Detection," 2010 International Conference on Communications and Intelligence Information Security, Nanning, 2010, pp. 113-116, doi: 10.1109/ICCIIS.2010.48.
U.S. Appl. No. 16/389,861—Office Action dated Oct. 13, 2020, 12 pages.
U.S. Appl. No. 15/368,240—Office Action dated Aug. 7, 2018, 28 pages.
U.S. Appl. No. 16/000,132—Office Action dated Oct. 2, 2018, 18 pages.
U.S. Appl. No. 15/368,240—Response to Office Action dated Aug. 7, 2018, filed Oct. 11, 2018, 25 pages.
U.S. Appl. No. 16/000,132—Response to Office Action dated Oct. 2, 2018, filed Nov. 13, 2018, 16 pages.
U.S. Appl. No. 16/000,132—Notice of Allowance dated Dec. 28, 2018, 16 pages.
U.S. Appl. No. 15/368,240—Office Action dated Feb. 8, 2019, 28 pages.
JP-20185473875—Notice of Allowance with Allowed Claims dated Mar. 25, 2019, 7 pages.
EP-17713822.9, Rule 71(3) Allowance Communication dated Mar. 8, 2019, 147 pages.
PCT/US2019/031867—International Search Reoprt and Written Opinion dated Sep. 9, 2019, 20 pages.
EP-19189235.5 Extended European Search Report dated Nov. 27, 2019, 5 pages.
U.S. Appl. No. 15/368,240—Office Action dated Dec. 26, 2019, 40 pages.
U.S. Appl. No. 15/368,246—Office Action dated Apr. 5, 2019, 40 pages.
U.S. Appl. No. 15/368,246—Response to Office Action dated Apr. 5, 2019, filed May 3, 2019, 16 pages.
U.S. Appl. No. 15/368,246—Supplemental Response to Office Action dated Apr. 5, 2019, filed Oct. 25, 2019, 8 pages.
U.S. Appl. No. 15/368,240—Response to Final Office Action dated Feb. 8, 2019 filed Apr. 19, 2019, 32 pages.
Kark et al, "Trends: Calculating the Cost of a Security Breach", Forrester Research, Inc. Apr. 10, 2007, 7 pgs.
"Data Breach: The Cloud Multiplier Effect", Ponemon Institute, Jun. 4, 2014, 27 pages.
Riley et al, "Magic Quadrant for Cloud Access Security Brokers", Nov. 30, 2017, 28 pages, downloaded from <<https://go.netskope.com/typ-gartner-mq-for-casb.html>>.
Lakshman et al., "Cassandra—A Decentralized Structured Storage System", 2009, 6 pages.
DeCandia et al, "Dynamo: Amazon's Highly Available Key-value Store", SOSP '07, Oct. 14-17, 2007, 16 pages.
Chang et al, "Bigtable: A Distributed Storage System for Structured Data", Operating Systems Design and Implementation, OSDI, 2006, 14 pages.
U.S. Appl. No. 15/368,246—Office Action dated Jan. 27, 2020, 20 pages.
U.S. Appl. No. 16/783,146—Office Action dated Mar. 27, 2020, 26 pages.
U.S. Appl. No. 16/783,146—Response to Office Action dated Mar. 27, 2020, filed Jun. 4, 2020, 21 pages.
U.S. Appl. No. 16/783,146—Notice of Allowance dated Jun. 17, 2020, 13 pages.
U.S. Appl. No. 15/368,240—Notice of Allowance dated Jun. 29, 2020, 22 pages.
Sumit Khurana, et al., "Performance evaluation of Virtual Machine (VM) scheduling policies in Cloud computing (spaceshared & timeshared)"; 2013 Fourth International Conference on Computing, Communications and Networking Technologies (ICCCNT); Year: Jul. 2013; pp. 1-5.
U.S. Appl. No. 16/409,685—Office Action dated Jul. 14, 2020, 28 pages.
U.S. Appl. No. 15/368,246—Notice of Allowance dated Oct. 6, 2020, 22 pages.
Cheng et al., "Cloud Security for Dummies, Netskope Special Edition," John Wiley & Sons, Inc., dated 2015, 53 pages.
"Cloud Data Loss Prevention Reference Architecture", Netskope, Sep. 2015, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope The 15 Critical CASB Use Cases", Netskope Inc., EB-141-1, dated 2015, 19 pages.
Netskope, "The 5 Steps to Cloud Confidence," netSkope Inc., 2014, 11 pgs.
"Netskope Cloud Confidence Index," netSkope, Inc., 2015, 4 pgs.

\* cited by examiner

300

```
1 '=0,38919,142594855 9,54fe3f90af7e16305c067caf |User2864 SC:0,1
ap=Google_Drive \
    sip=172.16.128.28 sc=UK dip=216.58.217.206 dl=Mountain_View dc=US
hod=0 pod=0 dow=1
```

FIG. 3

| Feature | Group | UI |
|---|---|---|
| Application | App | Yes |
| App Category | App | Yes |
| Source IP (broken down into the features: first octet | Src Location | |
| first 2 octets | Src Location | |
| first 3 octets | Src Location | |
| full IP | Src Location | |
| Source Location | Src Location | Yes |
| Source Country | Src Location | Yes |
| Source Zipcode | Src Location | Yes |
| Source Region | Src Location | Yes |
| Destination IP (broken down into the features: first octet | Dst Location | Yes |
| first 2 octets | Dst Location | |
| first 3 octets | Dst Location | |
| full IP | Dst Location | |
| Destination Location | Dst Location | Yes |
| Destination Country | Dst Location | Yes |
| Destination Zipcode | Dst Location | Yes |
| Destination Region | Dst Location | Yes |
| Dst Host | Dst Location | Yes |
| User Agent | UA | Yes |
| browser version | UA | Yes |
| OS | UA | Yes |
| Hour of Day (1 to 24) | Time1 | Yes |
| Part of Day (Hour of day / 5) | Time2 | Yes |
| Day of Week | Time3 | Yes |

FIG. 5

| average error | event error | event counter | actual value | predicted value | feature count |
|---|---|---|---|---|---|
| ... | ... | ... | ... | ... | ... |
| 0.295287 | 0.175051 | 2977 | 1.0000 | 0.6499 | 20 |
| 0.295194 | 0.020023 | 2978 | 1.0000 | 0.9600 | 20 |
| 0.295263 | 0.500000 | 2979 | 1.0000 | 0.0000 | 20 |
| 0.295169 | 0.013984 | 2980 | 1.0000 | 0.9720 | 20 |
| 0.295095 | 0.075039 | 2981 | 1.0000 | 0.8499 | 20 |
| 0.295163 | 0.500000 | 2982 | 1.0000 | 0.0000 | 20 |
| 0.295067 | 0.007363 | 2983 | 1.0000 | 0.9853 | 20 |
| 0.295035 | 0.200028 | 2984 | 1.0000 | 0.5999 | 20 |
| 0.295003 | 0.200048 | 2985 | 1.0000 | 0.5999 | 20 |
| 0.294925 | 0.062091 | 2986 | 1.0000 | 0.8758 | 20 |
| 0.294994 | 0.500000 | 2987 | 1.0000 | 0.0000 | 20 |
| 0.294962 | 0.200028 | 2988 | 1.0000 | 0.5999 | 20 |
| 0.294864 | 0.000000 | 2989 | 1.0000 | 1.0000 | 20 |
| 0.294766 | 0.002677 | 2990 | 1.0000 | 0.9946 | 20 |
| 0.294834 | 0.500000 | 2991 | 1.0000 | 0.0000 | 20 |
| 0.294736 | 0.000000 | 2992 | 1.0000 | 1.0000 | 20 |
| 0.294671 | 0.101652 | 2993 | 1.0000 | 0.7967 | 20 |
| 0.294740 | 0.500000 | 2994 | 1.0000 | 0.0000 | 20 |
| 0.294700 | 0.176496 | 2995 | 1.0000 | 0.6470 | 20 |
| 0.294669 | 0.200048 | 2996 | 1.0000 | 0.5999 | 20 |
| 0.294737 | 0.500000 | 2997 | 1.0000 | 0.0000 | 20 |
| 0.294706 | 0.200028 | 2998 | 1.0000 | 0.5999 | 20 |
| 0.294674 | 0.200028 | 2999 | 1.0000 | 0.5999 | 20 |
| 0.294576 | 0.000000 | 3000 | 1.0000 | 1.0000 | 20 |
| 0.294537 | 0.176514 | 3001 | 1.0000 | 0.6470 | 20 |
| 0.294455 | 0.050042 | 3002 | 1.0000 | 0.8999 | 20 |
| 0.294357 | 0.000000 | 3003 | 1.0000 | 1.0000 | 20 |
| ... | ... | ... | ... | ... | ... |

FIG. 6

```
7:25 io 22 /ns/data> bin/anomaly-detector -v 50 models/Tenant1.model
Tenant1/Tenant1.train
anomaly-detector: reading event stream - every '.' is 10000 events
......
Tenant1/Tenant1.train:98355: 51.6496x anomaly detected:
        u108 used Google_Drive on Friday 15:xx from San_Francisco (IP12)
.......
Tenant1/Tenant1.train:149862: 51.7x anomaly detected;
        u2139 used Google_Drive on Saturday 16:xx (Weekend) from
San_Francisco (IP17)
.;
Tenant1/Tenant1.train:166044: 54.5146x anomaly detected:
        u187 used Google_Drive on Saturday 20:xx (Weekend Night) from
San_Francisco (IP17)
..............
Tenant1/Tenant1.train:872034: 50.6586x anomaly detected:
        u2155 used Google_Drive on Sunday 03:xx (Weekend Night) from
Mountain_View (IP1)
.................
Tenant1/Tenant1.train:2398912: 55.994x anomaly detected:
        u2244 used Google_Drive on Saturday 13:xx (Weekend) from
Mountain_View (IP3)
......
5 anomalies in 2991859 events (0.000167128)
```

1110 — expanding a compressed set of stored likelihood coefficients and stored candles for a plurality of users into a hash space 1120 — receiving a security-related event that includes a user-space identifier (ID) and features with certain values 1130 — transforming the feature-value pairs into categorical bins of the hash space 1140 — applying a hash function to a combination of the user-space ID and the transformed feature-value pairs to retrieve the likelihood coefficients for the transformed feature-value pairs and the candle for the user-space ID 1150 — scoring the likelihood coefficients and any transformed feature-value pairs that do not have likelihood coefficients because they were not previously observed for the user-space ID, in combination with evaluating the candle, to produce an anomaly score 1160 — when the anomaly score represents a detected anomaly event, accessing history associated with the user-space ID to construct a contrast between feature-event pairs of the anomaly event and non-anomalous feature-value pairs of prior events for the user-space ID 1170 — reporting the anomaly event and the contrast

FIG. 11

MACHINE LEARNING BASED ANOMALY DETECTION AND RESPONSE

PRIORITY DATA AND RELATED APPLICATION

This application is a continuation of U.S. patent application Ser. No. 16/389,861, entitled "ANOMALY DETECTION WITH MACHINE LEARNING", filed Apr. 19, 2019, which is a continuation of U.S. patent application Ser. No. 15/256,483, entitled "MACHINE LEARNING BASED ANOMALY DETECTION", filed Sep. 2, 2016, which is related to and claims the benefit of U.S. Provisional Patent Application 62/346,382, "MACHINE LEARNING BASED ANOMALY DETECTION", filed on Jun. 6, 2016. The priority non-provisional and provisional applications are hereby incorporated by reference for all purposes.

This application is related to U.S. Provisional Patent Application No. 62/307,305, entitled, "SYSTEMS AND METHODS OF ENFORCING MULTI-PART POLICIES ON DATA-DEFICIENT TRANSACTIONS OF CLOUD COMPUTING SERVICES", filed Mar. 11, 2016. The related application is hereby incorporated by reference for all purposes.

FIELD OF THE TECHNOLOGY DISCLOSED

The technology disclosed generally relates to using machine learning for detecting in real-time anomalous events in network delivered services.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The technology disclosed relates to machine learning based anomaly detection. In particular, it relates to constructing activity models on per-tenant and per-user basis using an online streaming machine learner that transforms an unsupervised learning problem into a supervised learning problem by fixing a target label and learning a regressor without a constant or intercept. Further, it relates to detecting anomalies in near real-time streams of security-related events of one or more tenants by transforming the events in categorized features and requiring a loss function analyzer to correlate, essentially through an origin, the categorized features with a target feature artificially labeled as a constant. It further includes determining an anomaly score for a production event based on calculated likelihood coefficients of categorized feature-value pairs and a prevalencist probability value of the production event comprising the coded features-value pairs.

Sharing content from the cloud has never been easier. The challenge is that without visibility and control over what is being shared and with whom the content is being shared with, there is risk that sensitive data could get in the wrong hands. For example, when an Office 365 user shares sensitive content with a user outside of the organization, it has potential to be a risky situation. To help mitigate this risk, the technology disclosed allows setting of fine-grained access restrictions so as to enforce granular and precise policies on sensitive content.

The use of cloud services for a number of corporate functions is now common. Thus, instead of installing servers within a corporate network to run a customer relationship management (CRM) software product, a software as a service (SaaS) solution such as Salesforce.com's offerings can be used. The information technology (IT) and network architecture approaches that could log and protect access to a classic solution provide limited control. The sprawl of "bring your own devices" (BYODs) and the need to haul that traffic back to the enterprise make it less attractive. For example, VPN solutions are used to control access to the protected corporate network. Proxies (both transparent and explicit) may be used to filter, or limit access to undesirable web sites when the client is accessing the web sites from within the corporate network. Similar filtering software can be installed on client computers, e.g. safe browsing software, to enforce limits on access. A viable solution should provide consistent, centrally administered control, e.g. enforce the same policy across multiple devices, network services, and networks—including corporate networks.

Data is often the lifeblood of any business and it is critical that it is effectively managed, protected, and meets compliance needs. Protecting data in the past was focused primarily on on-premise scenarios, but with the increased adoption of cloud services, companies of all sizes are now relying on the cloud to create, edit, and store data. This presents new challenges. Despite its benefits, the cloud also makes it easy for people to lose sensitive corporate data. For one thing, people can access cloud services from multiple devices more easily. Another is that the cloud services make it easy to share data, including with people outside of an organization. For these reasons, it is easy for data to get out of an organization's control.

Also, as the number of cloud services increases exponentially, there are hundreds of ways data can leak. Employees might be attach a wrong file while sending emails, hit the send button too early, not be careful when rushing to a deadline, or share data and collaborate with people outside of their organization. The native cloud storage sync clients also pose a significant risk to organizations. A continuous sync takes place between the end point and the cloud service without employees realizing they are leaking confidential company information. In the case of disgruntled workers, the cloud services are making it super easy for them to steal intellectual property.

Accordingly, it is imperative to facilitate the use of cloud services so people can continue to be productive and use the best tools for the job without compromising sensitive information such as intellectual property, non-public financials, strategic plans, customer lists, personally identifiable information belonging to customers or employees, and the like.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 3 is a sample security-related event.

FIG. 5 depicts a sample of features for a connection event.

FIG. 6 illustrates a learning process in accordance with one implementation of the technology disclosed.

FIG. 7 shows a sample of anomaly output when the anomaly threshold is set to 50× relative-error spike.

FIG. 11 shows one implementation of a flowchart of detecting an anomaly event that has not frequently been observed in an ongoing event stream of security-related events of one or more organizations.

INTRODUCTION

Figure 1:
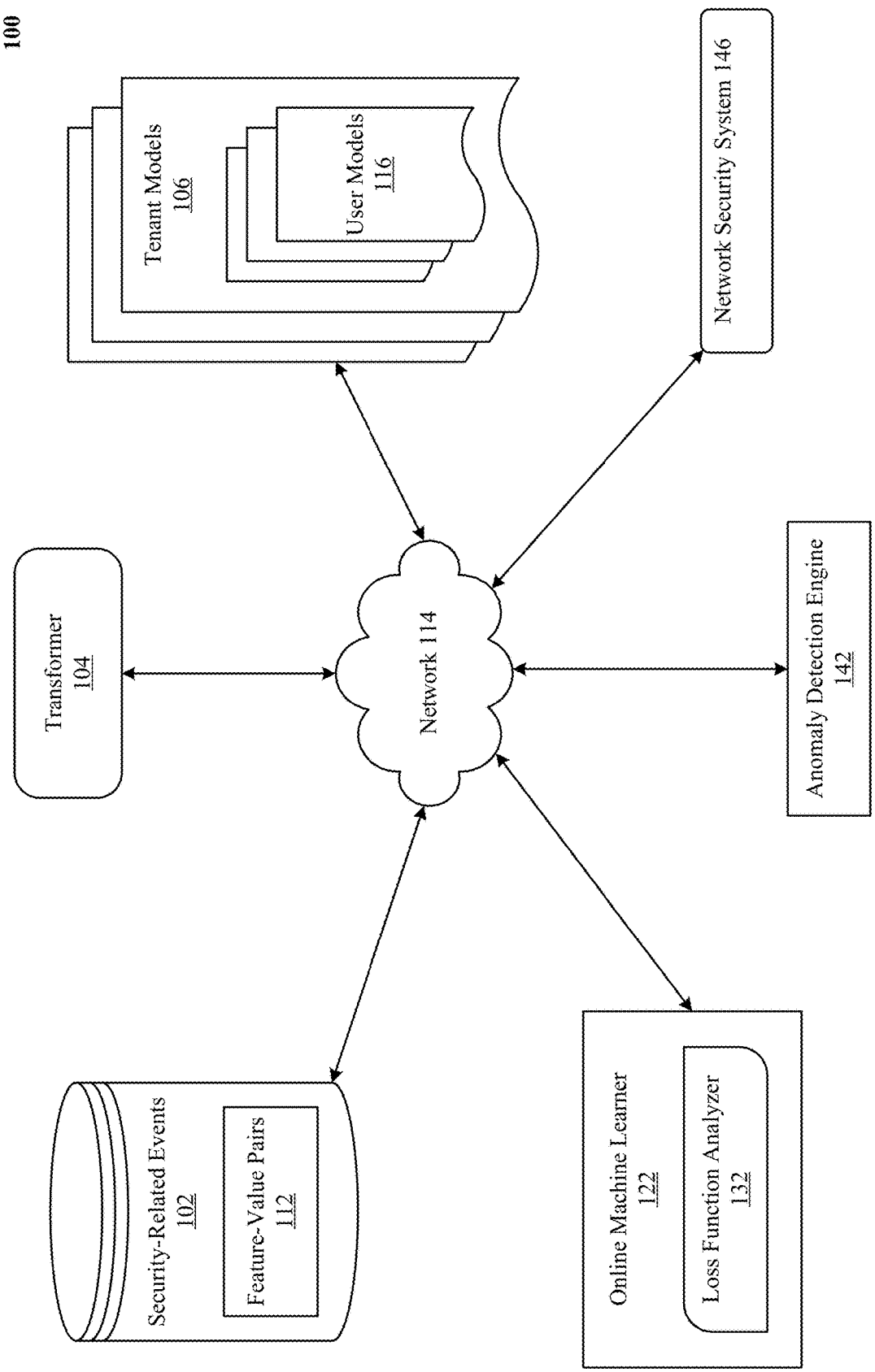
FIG. 1 illustrates a system implementing the machine learning based anomaly detection disclosed herein.

The technology disclosed relates to machine learning based anomaly detection. In particular, it relates to constructing activity models on per-tenant and per-user basis using an online streaming machine learner that transforms an unsupervised learning problem into a supervised learning problem by fixing a target label and learning a regressor without a constant or intercept. Further, it relates to detecting anomalies in near real-time streams of security-related events of one or more tenants by transforming the events in categorized features and requiring a loss function analyzer to correlate, essentially through an origin, the categorized features with a target feature artificially labeled as a constant. It further includes determining an anomaly score for a production event based on calculated likelihood coefficients of categorized feature-value pairs and a prevalencist probability value of the production event comprising the coded features-value pairs.

Traditional anomaly detection methods are either rule-based that do not generalize well since the rules are too specific to cover all possible scenarios or time-series based (time v/s. quantity), which are too low-dimensional to capture the complexity of real life. Real life events have higher dimensions (time, both source and destination locations, activity-type, object-acted on, application used, etc.)

Machine learning means just what it says, that pattern recognition should be done by the computer without being specifically told what to look for. There are two main types of machine learning: Supervised and unsupervised. The former is where the computer learns from a dataset of labeled training data whereas the latter is where the computer makes sense of unlabeled data and finds patterns that are hard to detect otherwise.

The machine learning based anomaly detection systems and methods disclosed herein use "whitelists" rather than "blacklists." The reason why whitelisting is critical is because it studies the good guys. Bad guys try to hide and outsmart blacklist-based platforms like anti-malware. The disclosed machine-learning anomaly detection system does not chase bad guys, looking for "bad-X" in order to react with "anti-X." Instead, the disclosed platform determines what is stable (good guys' normal behavior) and then looks out for outliers. This approach avoids engaging in a perpetual and futile arms race.

In addition, the disclosed machine learning based anomaly detection scales to billions of events per day and beyond. It is not practical at such a high scale to define whitelists a-priori, or keep a perfect history of all observed behavior combinations. Consequently, the disclosed anomaly detection models are "soft" in the sense that they always deal with conditional probabilities of event features and are ever-evolving. The disclosed machine learning based anomaly detection processes tens of thousands of events per second per each tenant/model thread on standard hardware. It runs hundreds of such threads in parallel and horizontally scales over time. It analyzes the probability of any event in near constant time versus all prior historical events. The time to calculate the probability of any event is linear with the number of dimensions in the event. Further, it detects anomalies as they come in, at a speed that is small constant multiplier over plain I/O of the same data.

The disclosed machine learning based anomaly detection is noise resistant. A common issue with existing anomaly detection systems is false-positives. In reality, it is hard to avoid false positives entirely because in the real world there is always an overlap between two distributions with unbounded ranges and different means. While it is difficult to avoid false-positives, the disclosed machine learning based anomaly detection allows the user to filter noise. When the disclosed machine learning based anomaly detection is applied to observe new users or devices, it detects patterns that are seen for the first time (a new IP address, a new application, a new account, etc.). Then, it learns sources habits over time and flags anomalies only when, statistically, the event stream from a source, such as a user or device, is considered seasoned, or established enough.

Furthermore, the disclosed machine learning based anomaly detection supports likelihood metrics per event. Using these metrics, operators can display only the top N most unlikely/unusual events, sorted in descending order, while automatically filtering out any other event with a less than "one in a thousand," or "one in a million" estimated probability to occur. Often these per-event likelihood metrics are based on the machine-learned statistical history of parameter values and their likelihood to appear together in context, for any source. It is up to the user to set the sensitivity thresholds to display what they want to see. This type of approach flags "rareness" and not "badness."

The disclosed machine learning based anomaly detection platform does not rely on specific, hard-wired rules. As a result, the detected machine-learned anomalies are not uni-dimensional, such as "location-based," "time-based," etc. Instead, they represent multiple, multi-dimensional spaces. The disclosed machine learning based anomaly detection looks at every feature of a given event and simultaneously evaluates the multiple features as a whole when calculating the likelihoods of each combination. In some implementations, an anomaly is triggered due to one unusual value in a dimension, or a combination of multiple dimensions falling out of bounds. The evaluated features are of various types, including: categorical or numeric, ordered or not, cyclical or not, monotonic or non-monotonic.

The disclosed machine learning based anomaly detection is robust and copes with missing data: Traditional batch machine learning clustering methods suffer from two critical issues: (1) they break in the face of incomplete data, such as missing dimensions in some events and (2) due to the curse of dimensionality and the way distance metrics between multi-dimensional points are computed, they lose their effectiveness in high-dimensions (typically about five dimensions). The disclosed machine learning based anomaly detection does not rely on traditional batch clustering such as k-means. It is feature agnostic, dimension agnostic and deals with missing or additional dimensions (features in an event) on the fly, as they appear.

The disclosed machine learning based anomaly detection is adaptable and self-tunable: Over time, even the most persistent habits tend to change. Users may switch to other applications, move to new geographical locations, etc. The disclosed machine learning based anomaly detection adapts over time to new patterns and user habits. Old unusual patterns become the new norm if they persist for a long enough period. All conditional event probabilities keep updating over time.

Since organizations tend to be very different in the usage profiles, cloud application mix, event dimensions, and number of users, it is important to keep a separate model for each organization and let it shift over time based on that organization's change over time. Also, in the real world, different sources tend to be very different in their normal behavior. Thus, personalization is achieved by having the disclosed machine learning based anomaly detection analyze each source separately and simultaneously. A source can be anything: a user, device, department, etc. Also, this fine-grained analysis of each source separately greatly improves signal-to-noise ratios. It does so by splitting input events and comprising features based on different organizations and further based on individual users within each organization, thus creating organization/tenant-specific and user-specific models of normal behavior.

The disclosed machine learning based anomaly detection is agnostic to the semantics of input features. All it cares about is the statistical probability of each feature to occur in its specific context. As a result, new features are add features (e.g., installing a new security camera, or any other new sensor) without code changes to the platform. The moment a new event source is introduced as a new input is the moment that anomalies can be detected for it.

Each anomalous event is dissected and explained in-context using "smoking gun" evidence. For example, a sample anomaly reporting includes "This event is highly unusual (1 in 9.67 million likelihood) because, for this particular user, the source location is unusual, and the time of day is unusual, and this application has never been used before." This is done while contrasting rare and unusual events with normal or common patterns. The platform does not pass judgment on the maliciousness of an event; it only focuses on likelihoods based on historical evidence. It is up to the user, given the information they have to decide whether to take action on the information provided by the anomaly detection platform.

DETAILED DESCRIPTION

Figure 2:
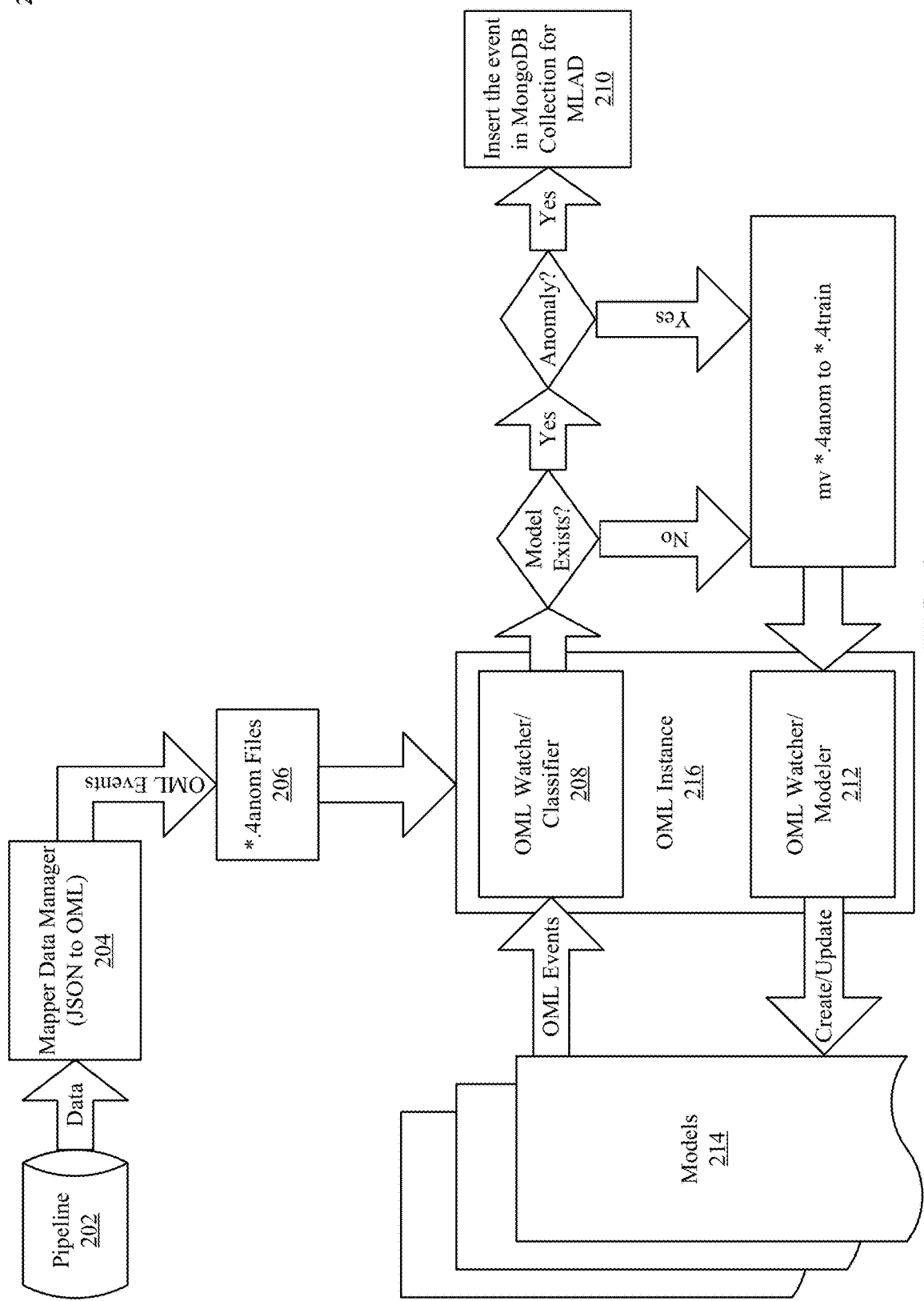
FIG. 2 shows an exemplary architecture of the machine learning based anomaly detection disclosed herein.

We describe a system and various implementations for detecting anomalies in network delivered services using machine learning techniques. The system and processes will be described with reference to FIGS. 1 and 2 showing an architectural level schematic of a system in accordance with an implementation. Because FIGS. 1 and 2 are architectural diagrams, certain details are intentionally omitted to improve the clarity of the description. The discussion will be organized as follows. First, the elements in the system and their use will be described in FIG. 1, followed by their interconnections in FIG. 2.

FIG. 1 illustrates a system 100 implementing machine learning based anomaly detection. FIG. 1 includes the system 100. The system 100 includes security-related events 102, feature-value pairs 112, transformer 104, tenant or organization models 106, user models 116, online machine learner 122, loss function analyzer 132, anomaly detection engine 142 and network security system 146. In some implementations, security-related events 102, feature-value pairs 112, tenant models 106 and user models 116 can be stored into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

FIG. 2 shows an exemplary architecture 200 of the machine learning based anomaly detection disclosed herein. The input to architecture 200 is security-related events 102 and the output is anomalies (if any exist). Online machine learner 122 is used to learning the normal patterns (training) and for anomaly detection (testing new data against know patterns). In one implementation, every chunk of incoming data is used twice: (1) to look for anomalies in it and (2) to update the so-called known or normal behavior models incrementally. In some implementations, if there are no existing models for a tenant and/or user, then the first step is skipped.

Security-related events 102 are fed to the architecture 200 via pipeline 202 (e.g., Kafka). First, a mapper data manager converts the security-related events 102 to a format compatible with the online machine learner (OML) 122 (e.g., OML instance 216). The OML-compatible security-related events 102 are fed to OML instance 216 as "*.4anom" files 206, after being converted to an OML-compliant format at 204 by a mapper data manager. according to one implementation. OML instance 216 then uses its classifier 208 to determine whether a model exists for a given tenant and/or user associated with the received security-related events 102. If a model does not exist, then OML instance 216 creates a model for that tenant and/or user using its OML watcher/modeler 212. Once created, the new models are stored as models 214.

If a model does exist for a given tenant and/or user associated with the received security-related events 102, then OML instance 216 detects anomalies in the security-related events 102, as discussed infra and stores the anomaly events in a data store 210 (e.g., MongoDB). Further, the models 214 are updated with the detected anomalies by the OMLwatcher/modeler 212 so that if the anomalous behavior becomes sufficiently frequent over time, then it can be detected as normal behavior rather than anomalous behavior. In one implementation, the anomaly events are transferred to the models 214 as "*.4train" files 206.

The interconnection of the elements of system 100 will now be described. The network 114 couples the security-related events 102, transformer 104, online machine learner 122, anomaly detection engine 142, network security system 146, tenant models 106 and user models 116 (indicated by solid lines). The actual communication path can be point-to-point over public and/or private networks. Some items, such as anomaly detection engine 142, might be delivered indirectly, e.g. via an application store (not shown). All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Online Machine Learner

Online machine learner 122 is a fast out-of-core machine learning system, which can learn from huge, terascale datasets in a short time period. Online machine learner 122 assumes that all data is not available at processing time and allows for incremental updates of relationships and links as new data is received. Online machine learner 122 processes large datasets streamed directly from large dynamic data sources via application programming interfaces (APIs). An API is defined as a packaged collection of code libraries, routines, protocols methods and fields that belong to a set of classes, including its interface types. The API defines the way that developers and programmers can use the classes for their own software development, just by importing the relevant classes and writing statements that instantiate the classes and call their methods and fields. In another implementation, an API is a source code based specification intended to be used as an interface by software components to communicate with each other. An API can include specifications for routines, data structures, object classes and variables. Basically, an API provides an interface for developers and programmers to access the underlying platform capabilities and features of online social networks. Implementations of the technology disclosed include different types of APIs, including web service APIs such as HTTP or HTTPs based APIs like SOAP, Bulk, XML-RPC and JSON-RPC and REST APIs (e.g., Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs (objet orientation) like Java API and Android API (e.g., Google Maps™ Android API, MSDN Class Library for .NET Framework, Twilio™ APIs for Java and C#), OS functions and routines like access to file system and access to user interface, object remoting APIs like CORBA and .NET Remoting and hardware APIs like video acceleration, hard disk drives and PCI buses. Other examples of APIs used by the technology disclosed include Box Content API™, Microsoft Graph™, Dropbox API™, Dropbox API v2™, Dropbox Core API™, Dropbox Core API v2™, Facebook Graph API™, Foursquare API™, Geonames API™, Force.com API™, Force.com Metadata API™, Apex API™, Visualforce API™, Force.com Enterprise WSDL™, Salesforce.com Streaming API™, Salesforce.com Tooling API™, Google Drive API™, Drive REST API™, AccuWeather API™, aggregated-single API like CloudRail™ API, and others.

Online machine learner (OML) 122 supports a number of large-scale machine learning problems such as importance weighting and selection of loss functions and optimization algorithms, including loss function analyzer(s) 132 like SGD (Stochastic Gradient Descent). OML 122 performs regression by learning a linear transformation w of the features x using gradient descent, so that the predicted value $\hat{y}^i$ for item i is determined by the following equation:

$$\hat{y}^i = \sum_j w_j x_j^i$$

A typical online machine learner uses the following algorithm:

Loop
  Get a new example
  Calculate prediction based on example input features and model weights (ignore the Truth in the example)
  Learn the Truth from the example
  Update the model weights based on the error in the prediction against the truth
  Repeat for specified number of passes or other convergence criteria Since the online machine learner 122 updates model states based on one example at a time, and since the complexity of each update is linearly proportional to the number of features in a single example, it does not need to load the entire data set into the memory. This allows typical online machine learners like online machine learner 122 to scale to unbounded dataset sizes. Processing speeds of online machine learners like online machine learner 122 typically reach millions of features per second per processing unit (CPU core), in some implementations.

Security-Related Events

Security-related events 102 are any identifiable unit of data that convey information about an occurrence. In one implementation, an event can also provide information concerning a user or an organization. An event can be of different types, such as a connection event, an application event or a generic network event. An event can have three aspects: a timestamp indicating when the event occurred; a set of dimensions indicating various attributes about the event; and a set of metrics related to the event. Events can be user-generated events such as keystrokes and mouse clicks, among a wide variety of other possibilities. System-generated events include statistics (e.g., latency/number of bytes, etc.), program loading and errors, also among a wide variety of other possibilities. In one implementation, events include network flow variables, device information, user and group information, information on an application (e.g., resource condition, variables and custom triggered events). An event typically represents some message, token, count, pattern, value, or marker that can be recognized within a network, such as network traffic, specific error conditions or signals, thresholds crossed, counts accumulated, and so on. A typical user interaction with an application like Google Drive™ processes a sequence of events that occur in the context of a session. The main events of note are (a) login—provide user credentials to hosted service to authenticate the user; (b) application transactions—execute a set of application level transactions, e.g. add leads or define new operations; and (c) log-out—this event terminates the session with the server. In some implementations, deep packet inspection logic tracks raw event data to identify events and stores them in an event repository. This application, in some implementations, interchangeably refers to "events" as "security-related events", and vice-versa. The technology disclosed can process other events types like connection events, application events, network events, in addition to, instead of, and/or in combination of the security-related events 102.

In one implementation, the input to the online machine learner 122 are plain text files such as so-called "*.4anon" files. These files include streams of security-related events 102. A stream of security-related events 102 is defined as an unbounded sequence of event tuples. According to one implementation, each event in a "*.4anon" file represents a single line. A sample security-related event 300 is described in FIG. 3. In FIG. 3, security-related event 300 is a connection event illustrated. Sample event 300 includes the following elements:

| Element | Description |
|---|---|
| 1 | Output or target feature |
| '=0,38919,1425948559, 54fe3f90af7e16305c067caf | Comment |
| \| | Pipe char |
| User2864 | Space ID |
| SC:0.1 | Standard candle feature |
| ap = Google_Drive | Feature is application (ap) and value is Google Drive |
| sip = 212.2.15.6 | Feature is source IP (dip) and value is IP address (212.2.15.6) |
| sc = UK | Feature is source country (sc) and value is country United Kingdom (UK) |
| dip = 216.58.217.206 | Feature is destination IP (dip) and value is IP address (216.58.217.206) |
| dl = Mountain_View | Feature is destination location (dl) and value is location Mountain View |
| dc = US | Feature is destination country (dc) and value is country United States (US) |
| hod = 0 | Feature-value pair assigned to a categorical bin of Hour-of-Day (hour after midnight) |
| pod = 0 | Feature-value pair assigned to a categorical bin of Part-of-Day (dawn) |
| dow = 1 | Feature-value pair assigned to a categorical bin of Day-of-Week (Monday) |
| os = Windows7 | Feature-value pair indicating what operating system is used by the user |
| dev = Desktop23 | Feature-value pair indicating which device was used and so on |

Sample event 300 is composed of two parts: output or target features and input features, separated by a pipe char "|". The output or target feature is the first item in the line. In one implementation, the output or target feature is a numeric. For instance, a constant 1 is used as the output or target feature in some implementations. Anything after the pipe char "|" are input features representing the sample event 300. In one implementation, the input features are separated and represent various parameters of the session like the application used, the time, the source and destination locations and IPs, etc. For example, dow=1 means day-of-week is Sunday, hod=0 means hour-of-day is the hour after midnight, pod=2 is part-of-day such as dawn, morning, midday, etc.

Standard Candle Feature

To distinguish between users that are seen for the first time, i.e., for whom the associated behavioral features are new and real breaches/compromises generated by events with previously unseen feature-value pairs, the technology disclosed uses a so-called standard candle feature. In one implementation, standard candle feature is randomly-valued and converges over time to well-defined values between a [0, 1] range. Thus, the value of the standard candle feature indicates whether a given space ID has had enough history, i.e., the standard candle value has progressed to a set threshold so that anomalies can now be flagged for that space ID.

In one implementation, a standard candle feature is instantiated when the first event for a new user is received and is thereon mandatorily maintained and updated over time until it exceeds a target threshold. In the sample shown in FIG. 3, standard candle feature "SC: 0.1" always exists and has a standard target or goal value. Standard candle feature is used to distinguish between seasoned and unseasoned users. In one implementation, new or unseasoned users have lower weights and established or seasoned users have weights that are close to the target threshold (0.1 in the example shown in FIG. 3, indicating that enough events have been registered for User2864).

Space ID or Event-Source ID

User2864 is the space ID or event-source ID feature and is used to separate features received for a particular user from the same features received for other users. In one implementation, the space ID feature is used to construct and persist user-specific models that maintain states or histories of a particular user's habits in isolation from other users. In one implementation pertaining to a user, the space ID or event-source ID is a user ID including the user's email address. In other implementations, the space ID or event-source ID represents at least one of device ID, department ID, and network source address ID.

"'=0,38919,1425948559,54fe3f90af7e16305c067caf" is a comment feature and is ignored by the online machine learner 122 in some implementations. In one implementation, the comment feature is used to embed the time-stamp at which a particular event occurred. In another implementation, the common feature is used as a look-up key (e.g., MongoDB event id) to retrieve a given event from an event database like security-related events 102. In some implementations, the look-up is performed whenever an anomaly event is detected and a query is made about the anomaly event. In other implementations, the comment feature is used to pass additional out-of-band information.

Feature-value pairs 112 include a plurality of dimensions such as one or more time dimensions (e.g., day-of-week, hour-of-day), a source location dimension (e.g., cloud), a source Internet Protocol (IP) address dimension, a destination location dimension, a destination IP address dimension, a source device identity dimension (e.g., browser, OS, device is being used), an application used dimension (e.g., Google Drive, Dropbox, etc. (may be partly correlated with destination location)), an activity type and detail dimension (e.g., uploads, downloads) and a manipulated object dimension (e.g., directory, file name, mime-type, etc.). Online machine learner 122 simultaneously learns all the dimensions of a given feature-value pair. In other implementations, thousands of dimensions are simultaneously learned by the online machine learner 122.

Transformation

Transformer 104 assigns feature-value pairs into categorical bins and ensures that at least a majority of the assignments, for example, 55 percent, 60 percent, 70 percent, or 90 percent of the assignments, during training period end up in categorical bins that cover at least two feature instances. In one implementation, transformer 104 assigns time-based features into multiple sets of periodic bins with varying granularity. For example, a time-based feature like an event timestamp feature is assigned into at least one day-of-week periodic bin with 7 distinct values, time-of-day periodic bin with 24 distinct values and part-of-day periodic bin with 6 distinct values (e.g., morning, noon, afternoon, evening, night, dawn). In other implementations, transformer 104 assigns an event timestamp feature into a day-of-month periodic bin with 31 distinct values.

Figure 4:
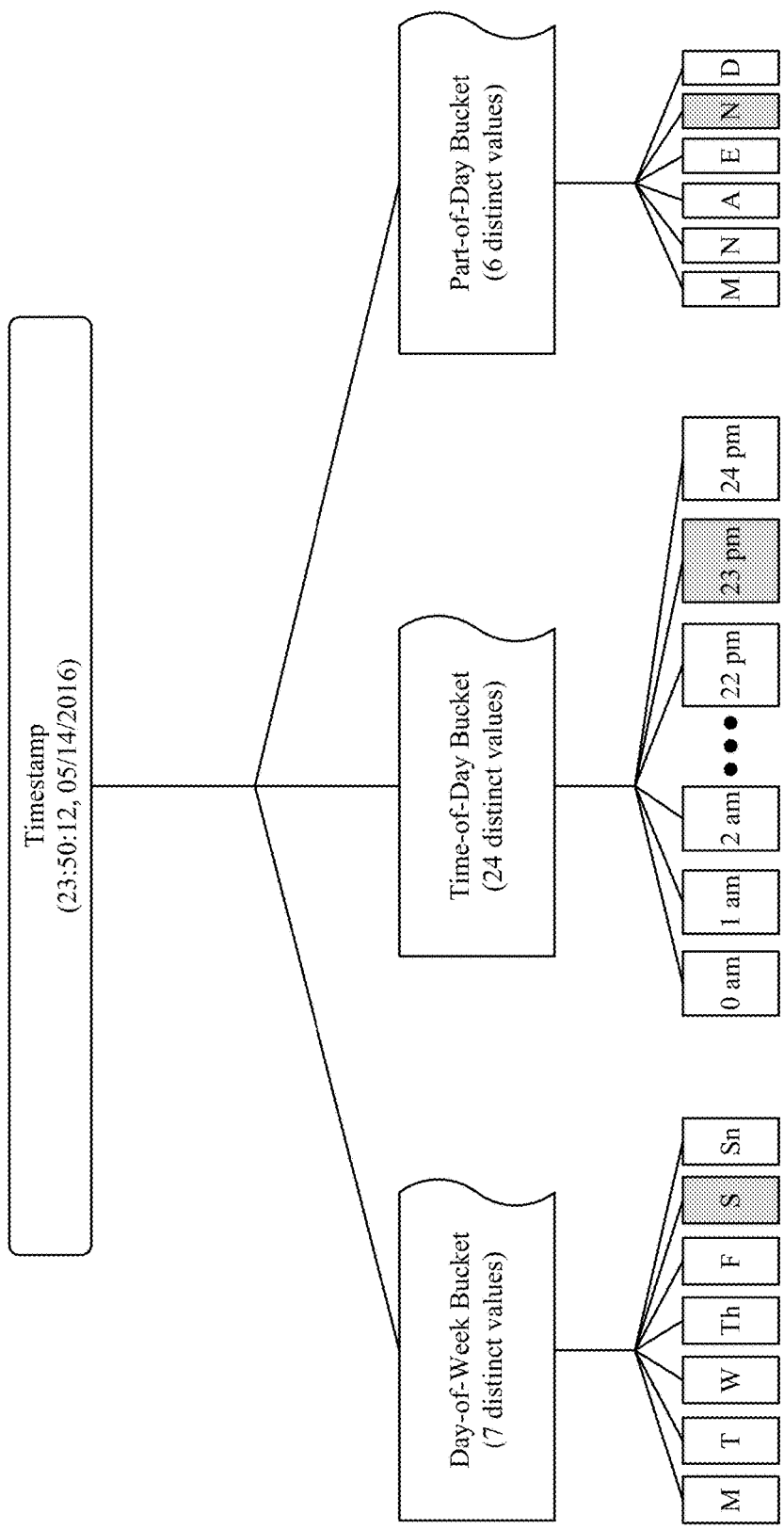
FIG. 4 illustrates one implementation of assigning time-based features of security-related events into multiple sets of periodic bins with varying granularity.

FIG. 4 illustrates one implementation of assigning 400 time-based features of security-related events into multiple sets of periodic bins with varying granularity. In one implementation, the periodic bins include: a day-of-week periodic bin with 7 distinct values, time-of-day periodic bin with 24 distinct values, and part-of-day periodic bin with 6 distinct values. In the example shown in FIG. 4, a timestamp with values (23:50:12, 05/14/2016) is assigned into three period bins such that since the timestamp was registered on a Saturday, it is assigned a Saturday slot in the day-of-week bucket. Also, since the timestamp was detected at 11 pm, it is assigned a $23^{rd}$ hour slot in the time-of-day bucket. Further, since the timestamp was detected at night, it is assigned a night slot in the part-of-day bucket.

Transformer 104 codes the input feature-value pairs with a Boolean value to indicate whether the input feature-value pairs are present in their respective categorical bins. For example, when an event timestamp feature indicates that an event occurred on a Saturday, then the feature-value pair is "DayOfWeek: Saturday". Transformer 104 maps "DayOfWeek: Saturday" to a binary feature equivalent to "DayOfWeek_is_Saturday=True". Transformer 104 further maps the binary feature "DayOfWeek_is_Saturday=True" to a memory location by applying a hash function to the binary feature "DayOfWeek_is_Saturday=True" (i.e., "binary-feature" or "name=value" string) in a very sparse vector (e.g., 2^27>134 million slots). As a result, each of the memory slots in a so-called "feaure=binnedValue weight-vector" is i) identified by the binary-feature string and ii) stores an approximate "normalized estimated probability" of the feature in it being "True". This hashing allows for learning of the probabilities of each feature-value pair in an independently and agnostic fashion such that respective "meanings" of the feature are made irrelevant and the feature-value pairs are stored as unique strings with corresponding "True" probabilities. In one implementation, the "True" probabilities are calculated within a [0, 1] range. In some implementations, the hashing allows for adding of features and models in a seamless and backward compatible manner. This prevents the need of writing new code or rewriting/editing of already written code when new features or news models (multiple new features) are added.

A single security-related event comprises a plurality of features. For instance, a connection event includes features likes operating system (OS), application, source IP (broken down into sub-features: first octet, first 2 octets, first 3 octets, full IP), source location, source country, source zipcode, source region, destination IP (broken down into sub-features: first octet, first 2 octets, first 3 octets, full IP), destination location, destination country, destination zipcode, destination region, destination host, user agent (broken down into a variety of sub-features like browser, version, OS, etc.), timestamp (broken down into categorical bins: hour-of-day (1 to 24), part-of-day (hour-of-day/6 (morning, noon, afternoon, evening, night, dawn), day-of-week (Monday to Sunday). A sample of features 500 for a connection event is provided in FIG. 5 and according to one implementation includes the following:

Features
Application
App category
Source IP (broken down into the sub-features)
First 2 octets
First 3 octets
Full IP
Source location
Source country
Source zipcode
Source region
Destination IP (broken down into the sub-features)
First 2 octets
First 3 octets
Full IP
Destination location
Destination country
Destination zipcode
Destination region
Destination host
User agent
Browser version
Operating System (OS)
Hour-of-Day (1 to 24)
Part-of-Day (Hour-of-Day/5)
Day-of-Week
Type of activity (e.g., activity "File Upload")
Object acted on (e.g., activity "Secrets.doc")
Sensitivity level (e.g., sensitivity "High" based on designation of confidential file assets by the tenant)
Degree of sharing (e.g., share-count: 3 based on number of external parties with whom the file is shared (3))

In other implementations, different event-types with different feature-value pairs are processed by the online machine learner 122, including application events and other network events.

Anomaly Detection Loop

FIG. 6 illustrates a learning process 600 in accordance with one implementation of the technology disclosed. Online machine learner 122 predicts the value of the output feature based on the last line of input features. It learns as it goes, i.e., online learning, gradually adjusting the weights for various features as they are correlated to the target feature. In one implementation, users differ in their typical profiles/habits and because each feature weight is stored under a specific space ID, the online machine learner 122 learns these habits and becomes more accurate over time at its user-specific predictions. In one implementation, the increase in accuracy is determined by tracking progression of the "average error" column (shown in learning process 600) towards smaller values over time.

In FIG. 6, only few lines of events are shown. In other implementations, learning process 600 includes thousands of events. In one implementation, when the predicted value or a so-called "prevalencist probability value" (shown in learning process 600 under "predicted value" column) is 0.0, this indicates events registered for new space IDs (i.e., users seen for the first time). In another implementation, when the predicted value is 1.0 and the error (shown in learning process 600 under "event error" column) is 0.0, this indicates commonly appearing events for a given user for whom the online machine learner 122 has perfectly learned the respective user habits.

Anomaly detection engine 142 implements the anomaly detection loop using multiple filtering stages, according to one implementation. At the first stage, anomaly detection engine 142 evaluates the first two columns of the learning process 600 and calculates a so-called "relative-error" spike ratio by dividing the values in the "event error" column with corresponding values in the "average error" column. In one implementation, if the relative-spike ratio exceeds a configurable threshold, this indicates that the current event is statistically unusual, i.e., the predicted value (based on the past events) is very different from the observed/actual value. For example, in FIG. 6, only a few events (e.g., 2979, 2982, 2987, 2991, 2994, 2997) in the "event counter" column have a "event error" value greater than the "average error" value. However, according to one implementation, this difference between the "event error" and "average error" values is not sufficient to trigger an anomaly event because in the example shown in FIG. 6, the relative-spike ratio is close to 1.0 and the default thresholds are set to only inspect cases where there is a more significant jump in relative-error (e.g., ~20×, configurable per tenant/model). In one implementation, this allows for detection and selection of an anomaly event amongst 10,000 registered events.

At the second stage, anomaly detection engine 142 evaluates the values in the "actual value" column against corresponding values in the "predicted value" column. When the predicted value is higher than the observed value, this indicates non-anomalous or normal events because anomalies are defined as features seldom or never seen before by the online machine learner 122. As a result, real anomalies have zero or very low learned weights. Thus, for a real anomaly, the predicted value is lower than the observed value.

At the third stage, anomaly detection engine 142 filters the candidate anomalies by the standard candle value associated with the given space ID and filters out unseasoned users, i.e., users with insufficient history. In one implementation, anomaly detection engine 142 identifies the maximum weighted feature-value pair in a given event and determines it to be a non-anomalous event or false-positive if the weight of the maximum weighted feature-value pair is below a set threshold. In the learning process 600, standard candle values for events 2979, 2982, 2987, 2991, 2994, 2997 have not matured to qualify the corresponding space IDs as matured users with sufficient history.

At the fourth stage, once a real suspected anomaly is identified (i.e., large relative-error, predicted value smaller than the observed/actual value and seasoned space ID), anomaly detection engine 142 evaluates the individual weights or so-called "likelihood coefficients" of the features of the event that caused the anomaly. This is done to identify so-called "smoking-gun features" or lowest likelihood coefficient feature-value pairs that have very low weights compared to other features in the same event. In one implementation, identification of at least one smoking-gun feature is required for the anomaly detection loop to proceed to the next stage.

At the fifth stage, anomaly detection engine 142 combines the estimated probabilities of the smoking-gun features into one overall estimated probability score or a so-called overall likelihood coefficient. This score is then compared to a set threshold and if it exceeds the threshold, the entire event, which contains the smoking-gun features, is flagged as an anomaly event. In one implementation, the smoking-gun features are persisted in a data store like MongoDB.

Other implementations of learning process 600 may perform the stages or actions in different orders and/or with different, fewer or additional stages or actions than those discussed in regards to FIG. 6. Multiple stages or actions can be combined in some implementations. For convenience, the anomaly detection loop is described with reference to the system that carries out a method. The system is not necessarily part of the method.

A sample of a template for reporting an anomaly event in naturally processed language includes the following:

Dear (whoever),

At (some timestamp) we have detected an event (details of event) which has been anomalous compared to previous history.

You may want to look at the details and take action on this.

A sample of anomaly output 700 when the anomaly threshold is set to 50× relative-error spike (i.e., lower thresholds producing more alerts) is shown in FIG. 7. In FIG. 7, 5 anomalies are detected in 2991859 events. In the first anomaly event, user "u108" of tenant 1 used Google Drive application on a Friday at time 15:xx from San Francisco. In the second anomaly event, user "u2139" of tenant 1 used Google Drive application on a Saturday (weekend) at time 16:xx from San Francisco. In the third anomaly event, user "u187" of tenant 1 used Google Drive application on Saturday at time 20:xx (weekend night) from San Francisco. In the fourth anomaly event, user "u2155" of tenant 1 used Google Drive application on Sunday at time 03:xx (weekend night) from Mountain View. In the fifth anomaly event, user "2244" of tenant 1 used Google Drive application on Saturday (weekend) at time 13:xx from Mountain View.

In some implementations, events and comprising feature-value pairs are assigned to respective space IDs to create so-called user models 116. Specifically, user model of a given user is separated from user models of other users on a space ID basis. Further, user models of users that belong to a same organization are combined and stored as so-called tenant models 106. In one implementation, user models belonging to a particular tenant model are stored in a common file. Since what is considered normal behavior differs from user to user, individual user models 116 provide user-activity history and patterns that is customized to each user for which anomalies can be triggered accordingly. Also, online machine learner 122 simultaneously constructs user models 116 and corresponding tenant models 106 for thousands of users/user devices (e.g., 100,000).

In one implementation, when an anomaly event is detected, history associated with the given space ID is accessed to construct a contrast between feature-value pairs of the anomaly event and non-anomalous feature-value pairs of prior events for the space ID. In one implementation, this is done by representing an anomaly event in a natural language form (e.g., English) based on the following anomaly event template:

"feature=value is unusual/NEW for space ID"

A few sample anomaly reports generated using the above template include:

Sunday (day-of-week) is unusual for Joe 194/tcp (port and network protocol) is NEW for device-X In the example above, a string like "UserJoe/DayofWeek=Sunday" is hashed to a location in memory that holds a feature estimated probability that is amortized and weighted.

In some implementations, loss function analyzer 132 is required to correlate coded feature-value pairs in categorical bins essentially through an origin. In particular, this correlation is done with a target feature artificially labeled as a constant (e.g., 1, 2, 10, and the like). Thus, the loss function analyzer 132 runs a linear regression without an intercept constant to generate a probability prediction for the features having the values they are paired to. Using a constant label with no-intercept-constant regression results in weights that represent approximate frequencies per feature dimension, per event and per space ID.

In some implementations, model weight-vectors of feature-value pairs are stored as sparse models, i.e., having zero weights in most of the vector-space. This ensures that feature-value pairs that have not been seen before have zero weights. The unseen combinations of feature-value pairs are far more numerous than the seen combinations. (e.g., IP address feature could have 2^32 values, however only few are used). As a result, in one implementation, dense models of normally seen feature-value pairs and respective probabilities are mapped from a small number of seen feature-value pairs to a much larger space of most zero slots for feature-value pairs that may potentially be seen in the future. In some implementations, the mapping is done without hash-collision with existing features.

Accordingly, the tenant models 106 and the user models 116 are stored on disk using dense models. In contrast, the tenant models 106 and the user models 116 are stored in memory using sparse models (mostly zeros). In one example, a tenant model with 5 million distinct features can be stored on disk using only 20 megabytes (MB) by storing each feature-value pair as a pair of [32_bit_hash_location, 32_bit_float weight], each of which occupies only 8 bytes. Further, the same 20 MB model is stored in memory using 800 MB (almost 1 GB of mostly zeros) when it is mapped into memory for the purpose of detecting anomalies. Such a combination of "on-disk dense models" and "in-memory sparse models" allows the online machine learner 122 to simultaneously construct models for hundreds of tenants or organizations by working in event mini-batches and multiplexing the limited memory of a computer among these event batches.

Some sample detected anomaly events include:
Unusual Hour of Day and Day of Week for a user.
/opt/ns/mlad/tenant/1000/2015-03-09-17-21-07..2015-04-23-04-24-40.4anom:350048: 27.24x (AdB=4.81947) anomaly detected.
HoD=4 is unusual for user User48
DoW=5 is unusual for user User48
Unusual location: State=Oregon, (a travelling employee)?
dip2 is the 1st 2 octets of the destination IP (of the app) which adapted/changed due to location of the source.
sr=OR is unusual for user User211
dip2=8.35 is unusual for user User211
Resume uploading to a never used before ap: sign of an "at risk" employee?
ap=JobDiva is NEW for REDACTED@redacted.com
obj=REDACTED 2015ResumeDOS.docx is NEW for "REDACTED@redacted.com"
Downloading a *.exe file from a never-used before cloud destination.
Windows installers often come as *.exe files, meaning a new software is likely about to be installed.
obj=HPSupportSolutionsFramework-12.0.30.81.exe is NEW for "REDACTED@redacted.com"
A CTO of a company visiting a customer in St Paul, Minn. but the reported destination for a cloud service log-in is Canada because the log-in requested routed to the cloud service's server in Canada.
generated: Tue Oct 13 06:23:06 2015 (Los Altos local time)
"sip2=72.21 is NEW for User",
"sl=Saint Paul is NEW for User",
"sip3=72.21.248 is NEW for User",
"sz=55102 is NEW for User",
"sr=MN is NEW for User",
"dip=209.167.231.17 is NEW for User",
"dip2=209.167 is NEW for User",
"dl=Toronto is NEW for User",
"dc=CA is NEW for User",
"dz=M5V is NEW for User",
"dr=ON is NEW for User",
"HoD=13 is NEW for User",
"HoD/5=2 is NEW for User",
"sip=72.21.248.204 is NEW for User",
"DoW=1 is unusual for User",
"ap=Box is unusual for User",
"sc=US is unusual for User"
Sharing a sensitive/confidential file with an external entity (potential data loss/exfiltration). Note: "NEW" means "never seen before".
ap=Box is extremely unusual for REDACTED@example.com
act=Upload is unusual for REDACTED@example.com
obj="M&A-MasterPlan.doc" is NEW for REDACTED@example.com
share="REDACTED2@another-company.com" is NEW for REDACTED@example.com Network Security System Network security system 146 includes an active analyzer, inspective analyzer, monitor, and a storage unit. The storage unit stores, among other things, content policies, content profiles, content inspection rules, enterprise data, clients, and user identities. Enterprise data can include organizational data, including but not limited to, intellectual property, non-public financials, strategic plans, customer lists, personally identifiable information belonging to customers or employees, patient health data, source code, trade secrets, booking information, partner contracts, corporate plans, M&A documents, and other confidential data. In particular, the term "enterprise data" refers to a document, a file, a folder, a webpage, a collection of webpages, an image, or any other text-based document.

The network security system 146 can be viewed as providing several functionalities; key among them are an active analyzer, an inspective analyzer, an extraction engine, a classification engine, a security engine, a management plane, and a data plane. The management clients include tablet and mobile. Network security system 146 processes event streams from various hosted services or cloud services or cloud applications or cloud storage providers or cloud storage applications or cloud computing services (CCS). Also as used herein, a cloud service, sometimes also referred to as a cloud computing service (CCS), or a hosted service or a cloud application refers to a network cloud service or application, web-based (e.g. accessed via a uniform resource locator (URL)) or native, such as sync clients. Examples include software as a service (SaaS) offerings, platform as a service (PaaS) offerings, and infrastructure as a service (IaaS) offerings, as well as internal enterprise applications that are exposed via URLs. Examples of common cloud services today include Salesforce.com™, Box™, Dropbox™, Google Apps™, Amazon AWS™, Microsoft Office 365™, Workday™, Oracle on Demand™, Taleo™, Yammer™, and Concur™. Cloud services provide functionality to users that is implemented in the cloud and that is the target of policies, e.g. logging in, editing documents, downloading bulk data, reading customer contact information, entering payables, deleting documents, in contrast to the offerings of a simple website and ecommerce sites. Note that some consumer facing websites, e.g. Facebook™ and Yammer™, which offer social networks are the type of cloud service considered here. Some services, e.g. Google's Gmail™ can be a hybrid with some free users using the application generally while other corporations use it as a cloud service. Note that implementations can support both web browser clients and application clients that use URL-based APIs. Thus, using Dropbox™ as an example, user activity on the Dropbox™ website, as well as activity of the Dropbox™ client on the computer could be monitored. The client devices include a mobile and a computer. The mobile includes an AppWrapper and a VPN on demand. The computer includes a client that in turn includes a user identity and a policy.

Monitor and storage unit can include one or more computers and computer systems coupled in communication with one another. They can also be one or more virtual computing and/or storage resources. For example, the monitor can be one or more Amazon EC2 instances and storage unit can be an Amazon S3 storage. Other computing-as-service platforms such as Force.com from Salesforce, Rackspace, or Heroku could be used rather than implementing network security system 146 on direct physical computers or traditional virtual machines. Additionally, to implement the functionalities one or more engines can be used and one or more points of presence (POPs) can be established. The engines can be of varying types including a workstation, server, computing cluster, blade server, server farm, or any other data processing system or computing device. The engine can be communicably coupled to the databases via a different network connection. For example, an extraction engine can be coupled via the network(s) 114 (e.g., the Internet), classification engine can be coupled via a direct network link and security engine can be coupled by yet a different network connection. In other examples, the data plane POPs can be distributed geographically and/or co-hosted with particular cloud services. Similarly, the management plane POPs can be distributed geographically. The two types of POPs can be either separately hosted or co-hosted as well.

The management clients according to one implementation are computing devices with a web browser with a secure, web-delivered interface provided by the network security system 146 to define and administer content policies. The network security system 146 according to some implementations is a multi-tenant system, so a user of a management client can only change content policies associated with her organization. In some implementations, APIs can be provided for programmatically defining and or updating policies. In such implementations, the management clients can include one or more servers, e.g. a corporate identities directory such as a Microsoft Active Directory, pushing updates, and/or responding to pull requests for updates to the content policies. Both systems can co-exist; for example, some companies may use a corporate identities directory to automate identification of users within the organization while using a web interface for tailoring policies to their needs. Management clients are assigned roles and access to the network security system 146 data is controlled based on roles, e.g. read-only vs. read-write.

Inspective analyzer leverages API connections to inspect content that is already resident in the cloud services, irrespective of when the content was uploaded or when it was created. In particular, each of the cloud services are communicably interfaced with network 114 via their respective APIs through which content from the respective cloud services and metadata about the content is observed, listened to, monitored, tracked, collected, aggregated, assembled, retrieved, etc. Such content is, for example, files, folders, documents, images, and videos and content metadata is, for example, file or folder level details like who the file or folder owner is, which cloud application is hosting the file or folder and additional detail such as which DLP policies have been triggered on the file or folder, when was the file or folder created, posted, edited, modified, an audit trail of user activity, version history, file type, and others. In other implementations, the collected content metadata provides details on file exposure, including whether files are private, shared internally, shared externally with specific people or shared publicly via a link. In yet other implementations, inspective analyzer discovers content against set DLP policies, inventories and classifies content, content owners, and collaborators as well as provides content sharing status (private, shared or public). Additionally, it enables users to download files for review, and perform a variety of security actions such as restrict access, revoke sharing, encrypt content, quarantine content for review, notify content owners, and place content on legal hold.

In one implementation, inspective analyzer includes a data aggregator (omitted to improve clarity). Data aggregator includes listener capable of listening to streams and data flows originating at the cloud services by connecting with their respective APIs via the public Internet. In some implementations, listener includes heterogeneous instances responsible for the intake of content and content metadata from different cloud services. Listener listens for both structured data, such as values and keywords returned from the APIs, and also listens for unstructured data, such as text in logs and so forth. In some implementations, listener includes a miner for performing a pull from the APIs and a crawler for other cloud services which do not expose a public API. In one implementation, to consume data from APIs, listener provides a push API with a valid endpoint. This endpoint can take the form of an HTTP/HTTPS server, a UDP socket, or a message queue listener (e.g., Apache Kafka™, RabbitMQ™, ActiveMQ™, and others). The listener can also throttle messages as necessary to ensure none are dropped. According to one implementation, inspective analyzer includes a handler component (omitted to improve clarity) that is configured to receive the content and content metadata over the network and an application protocol layer, or other higher protocol layer, such as HTTP protocol layer, among many possible standard and proprietary protocol layers. These higher protocol layers can encode, package and/or reformat data for sending and receiving messages over a network layer, such as Internet Protocol (IP), and/or a transport layer, such as Transmission Control Protocol (TCP) and/or User Datagram Protocol (UDP).

In some implementations, the gathered content metadata is processed and/or normalized. In some instances, metadata includes structured data and functionality targets specific data constructs provided by the cloud services. Non-structured data, such as free text, can also be provided by, and targeted back to, the cloud services. Both structured and non-structured data are capable of being aggregated by the inspective analyzer. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store like Apache Cassandra™, Google's BigTable™, HBase™ Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprised of rows and sets of columns.

In one implementation, inspective analyzer includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parting or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by inspective analyzer are not homogenous (e.g., there are many different sources in many different formats), certain implementations employ at least one metadata parser per cloud service, and in some cases more than one. In other implementations, inspective analyzer uses the monitor to inspect the cloud services and assemble content metadata.

Active analyzer enforces policies in real-time on sensitive content using monitor when the sensitive content traverses the network 114 inline. The monitor performs content inspection (CI) on the cloud services transactions and traffic via the application programming interfaces (APIs) by identifying each of the cloud services interfacing with an organization's network. Monitor can specify data packets (stored in packet buffer) to be inspected and content inspection rules to be applied to the data packets. In one implementation, the monitor can use CI to find application layer objects, SIP packets, verify media (e.g. real-time transport protocol (RTP) media) of the media packets, and otherwise inspect the packets sent through the network 114. Packets can be inspected for any suitable feature, including, packet signature, bandwidth used by packets, compression protocol, content, or other suitable features. In other implementations, CI is performed for packets in the flow of packets for a specific client over the network 114 including looking at the packet headers along with the packet's payload. Monitor can employ different techniques to perform CI. In one implementation, it can use pattern matching that includes scanning for strings or generic bit and byte patterns anywhere in the packets. In another implementation, it can use behavioral analysis which includes scanning for patterns in the communication behavior of a cloud service, including absolute and relative packet sizes, per-flow data and packet rates, number of flows and new flow rate per cloud service. In yet another implementation, it can use statistical analysis that includes the calculation of statistical indicators that identify transmission types (e.g. media files, instant messages, or content transfer), including mean, median, and variation of values collected as part of the behavioral analysis. In addition to CI, the monitor also performs shallow packet inspection that tracks network connections or flows by grouping all packets with a 5-tuple (source IP, destination IP, source port, destination port, and layer-4 protocol).

Following this, an extraction engine extracts content and content metadata or object metadata from the packets stored in packet buffer by parsing the traffic packets at multiple levels, such as the physical, data link, or network layers. In particular, the extraction engine can extract text and information representation from the content (e.g. a feature structure), grammatical/semantic information from the content (e.g. a parse tree that identifies watermarks in documents), or metadata about the content (e.g. in-content headers/footers, author, last modified time data, and other suitable metadata types). In one implementation, extraction engine uses parsing functions on upper-layer protocols, including FTP, SMTP, IMF, HTTP, SMB, and the like. It can also use a rich language of variable length text and/or binary phrases, such as regular expressions, to extract the application layer objects from the protocol data stream.

In other implementations, the extraction engine extracts complex object metadata from the content that identifies structure of the content. For example, it can identify key fields of a message, such as "TO" and "FROM" fields of an e-mail. Other non-exhaustive examples of complex object metadata include file or folder level details like who the file or folder owner is, which cloud application is hosting the file or folder and additional detail such as which DLP policies have been triggered on the file or folder, when the file or folder was created, posted, edited, modified, an audit trail of user activity, version history, file type, and others. In other implementations, the collected content metadata provides details on file exposure, including whether files are private, shared internally, shared externally with specific people or shared publicly via a link, IP addresses, email addresses, recipient addresses, sender addresses, time of the e-mails, web-URLs, contact lists, instant message IP addresses, chat aliases, VOIP addresses, logins, sender and receiver of instant messages, a file name sent in an instant message or an email, a number of files transferred in the web-communication, a type of instant message text, a name of an audio and/or video attachment sent in the web-communication, a number of parties involved in a web-communication, a time of a social networking post, a size of a social networking post, a number of followers, likes, users, user groups, cloud service, cloud service groups, time of day, day of week, geo-location, bandwidth usage, latency observed, criticality data, anomalous behavior data, malicious behavior data, and others.

After the object metadata is extracted, it is organized into data sets and stored as lists, tuples, dictionaries, tables, and/or sets in a metadata store, according to one implementation. The classification engine can then issue commands (e.g. SQL statements, BNF statements) to the database to retrieve and view the data. Additional programs and commands can be executed to derive relationships between the data elements in the tables of the relational database. Supplementary data contained in other tables in the relational database can be combined with the extracted content, according to one implementation.

Classification engine evaluates the extracted content and content metadata according to the applicable content policies, content profiles, and content inspection rules. In one implementation, a packet can match a content inspection rule if the characteristics of the packet satisfy conditions of the content inspection rule and qualify as content subject to content control. In particular, classification engine compares the extracted content with the arguments defined in the applicable standard search pattern or the custom search pattern (as discussed infra) by using a plurality of similarity measures.

The following discussion outlines some examples of the similarity measures used by the classification engine to determine whether strings in extracted content match one of the applicable content inspection rules. One example of a similarity measure is unigram overlap. The baseline unigram approach considers two strings to be similar if they have higher Jaccard similarity than a threshold. The Jaccard coefficient between the unigrams is used to measure the similarity of the pair of strings. In some implementations, Jaccard similarity between two strings can be conditional upon the presence of certain essential tokens. In another implementation, an edit distance technique can be used to determine the similarity between strings. The edit distance between two strings is considered, that is, two strings are a match if the number of edits to transform one string into the other is less than some threshold value. In some implementations, a Levenshtein distance can be used as a metric for measuring the amount of difference between two strings. The distance is the minimum number of edits required in order to transform one string into the other.

In other implementations, different similarity measures can be used to determine similarity such as Euclidean distance, Cosine similarity, Tanimoto coefficient, Dice coefficient, Hamming distance, Needleman-Wunch distance or Sellers Algorithm, Smith-Waterman distance, Gotoh Distance or Smith-Waterman-Gotoh distance, Block distance or L1 distance or City block distance, Monge Elkan distance, Jaro distance metric Jaro Winkler, SoundEx distance metric, Matching Coefficient, Dice Coefficient, Overlap Coefficient, Variational distance, Hellinger distance or Bhattacharyya distance, Information Radius (Jensen-Shannon divergence) Harmonic Mean, Skew divergence, Confusion Probability, Tau, Fellegi and Sunters (SFS) metric, FastA, BlastP, Maximal matches, q-gram, Ukkonen Algorithms and Soergel distance.

Security engine accesses content policies to identify security actions to be performed. In some implementations, the security engine includes a plurality of sub-engines such as alert sub-engine, coach sub-engine, justification sub-engine, quarantine sub-engine, and encryption sub-engine. Upon detecting content that is subject to content control, one or more of the security sub-engines are invoked based on the rules defined in the content policies, the content-level activity being performed, and the content-type. Other implementations can include different or more sub-engines, such a block sub-engine, a bypass sub-engine, and a remediate sub-engine.

Deep API Inspection (DAPII)

The cloud service detection and content-based function or activity identification provided by the network security system 146 will be described by focusing on application layer traffic.

The technology disclosed uses an algorithm-based traffic analysis that discovers cloud services interfacing with an organization's network by deep inspecting services transactions in real-time, including calls made to the services. The technology disclosed uses connectors or standardized integrations to interpret the transactions between client and cloud services. The transactions are decomposed to identify the activity being performed and its associated parameters. The transactions are represented as JSON files, which include a structure and format that allows the monitor to both interpret what actions a user is performing in the cloud service and when it is happening. So, for example, the monitor can detect for an organization that "Joe from Investment Banking, currently in Japan, shared his M&A directory with an investor at a hedge fund at 10 PM".

A typical user interaction with a cloud service like Salesforce.com consists of a sequence of events that occur in the context of a session. The main events of note are: (a) login—provide user credentials to cloud service to authenticate the user; (b) application transactions—execute a set of application level transactions, e.g. upload meeting notes, add leads, or define new campaigns; and (c) log-out—this event terminates the session with the server. In this context an application session connects these interactions for the network security system. Deep API inspection logic can identify these events and link policy evaluations to each transaction boundary enabling actions to be taken. Most commonly, the application session is identified by a session cookie in the HTTP header. The network security system 146 can use the session cookie to define the session or alternately use a tuple that includes user id, user IP address, device, operating system and browser/native application to define the session.

Data Mining and Anomaly Detection

The network security system 146 generates logging information, e.g. raw event data, with information gleaned from every cloud application transaction passing through the system. Mining of the event data can thus accomplish several key tasks:

Identify content-based functions and activities such as creating content, uploading content, posting content, and editing content.

Identify non-content-based functions and activities such as inviting users to access content, share content, and view content.

Establish a baseline usage behavior based on criteria such as: user, user groups, cloud service, cloud service groups, time of day, day of week, geo-location, bandwidth usage, and latency observed. Note the usage behaviors can be tracked per company using the system and/or across companies.

Once the baseline usage behavior is established, anomalous activities are those that do not fit the observed baseline and could be flagged for administrators to review and take action. Example anomalous activities include: user accesses from a geo-locations and/or times that do not fit the baseline and bandwidth usage by a user being very high, e.g. over two standard deviations compared to measured baseline. Notably, the rules are sensitive to roles, e.g. a user in a custom-defined sales group may be afforded greater latitude to be in a non-standard geo-location than an employee outside that group. In some implementations, some anomalous activities may also be conditions to policies that companies define specific actions, e.g. block for excessive transfer anomaly condition until an administrator approves it.

According to one implementation, the raw event data is stored in metadata store analyzed using machine-learning techniques to establish the baseline. Both supervised (rules based) and unsupervised (clustering) methods can be employed. The baseline data and anomalies can be presented in a human manageable format through the management interface. For example access patterns based on geo-location could be presented using a map interface with points representing users and cloud services and connective arcs showing the usage. According to another implementation, there is an API available to mine the raw data. This API can be used by partners to build value added applications using the data collected by the system. Notably, the anomalies can be tracked across multiple cloud services. For example, a download of data from one service followed by an upload to a second could be an anomaly policy that is automatically detected. Other cross service policies having to do with data integrity and security can similarly be established with suitable conditions.

Process

Figure 8:
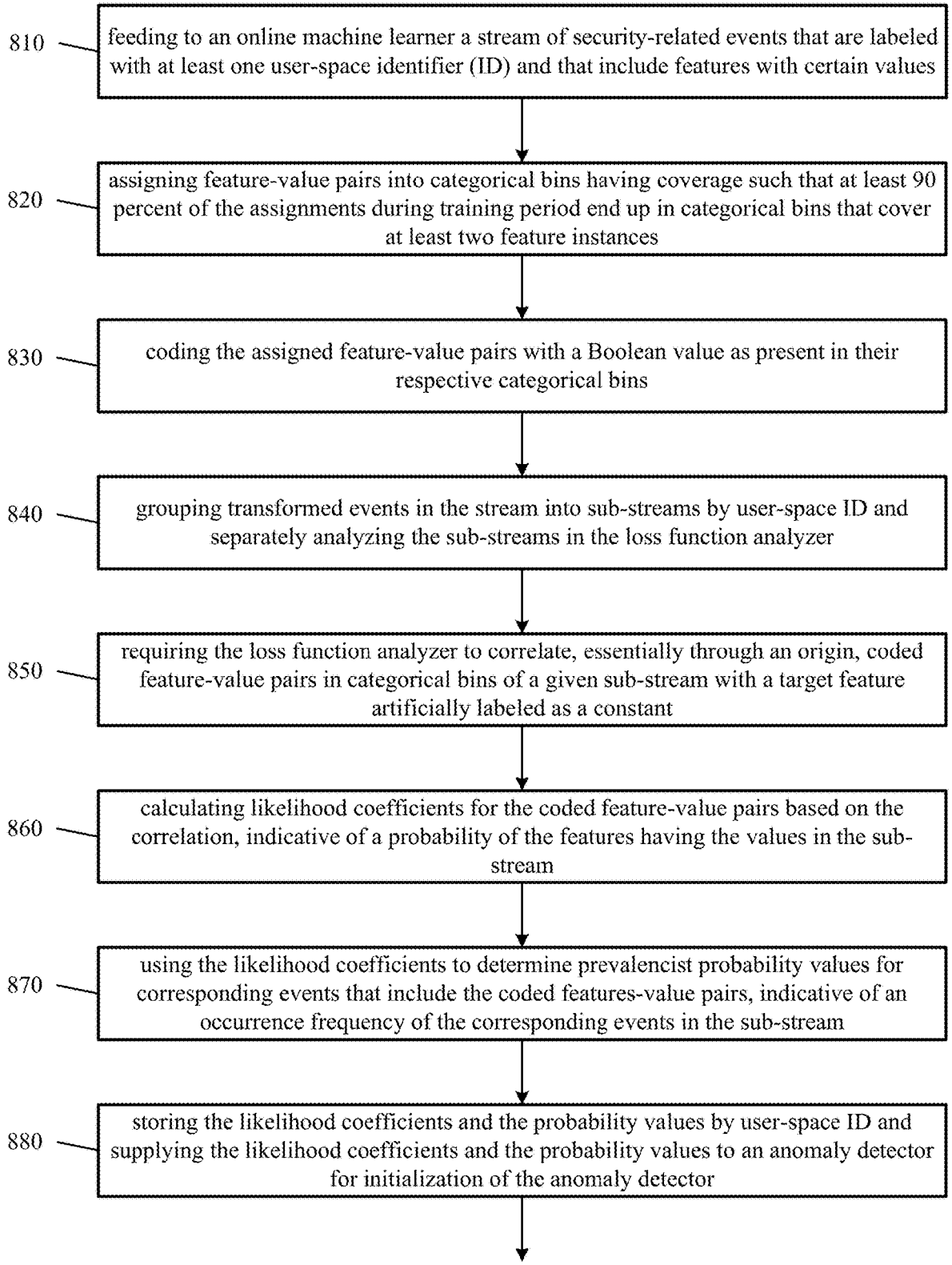
FIG. 8 illustrates one implementation of a representative method of initializing an anomaly detector that handles an event stream of security-related events of one or more organizations.

FIG. 8 illustrates one implementation of a representative method 800 of initializing an anomaly detector that handles an event stream of security-related events of one or more organizations. Flowchart 800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this flowchart is described with reference to the system that carries out a method. The system is not necessarily part of the method.

At action 810, a stream of security-related events is fed to an online machine learner. The events are labeled with at least one space identifier (ID) and include features with certain values.

At action 820, feature-value pairs are assigned into categorical bins having coverage such that at least a majority of the assignments, for example, 55 percent, 60 percent, 70 percent, or 90 percent of the assignments, during training period end up in categorical bins that cover at least two feature instances.

At action 830, the assigned feature-value pairs are coded with a Boolean value. The coding represents the feature-value pairs as present in their respective categorical bins.

At action 840, the transformed events in the stream are grouped into sub-streams by space ID. Further, the sub-streams are separately analyzed in the loss function analyzer.

At action 850, the loss function analyzer is required to correlate, essentially through an origin, coded feature-value pairs in categorical bins of a given sub-stream with a target feature artificially labeled as a constant.

At action 860, likelihood coefficients are used to determine the coded feature-value pairs based on the correlation, indicative of a probability of the features having the values in the sub-stream.

At action 870, the likelihood coefficients are used to determine prevalencist probability values for corresponding events that include the coded features-value pairs, indicative of an occurrence frequency of the corresponding events in the sub-stream.

At action 880, the likelihood coefficients and the probability values are stored by space ID and supplied to an anomaly detector for initialization of the anomaly detector.

Figure 9:
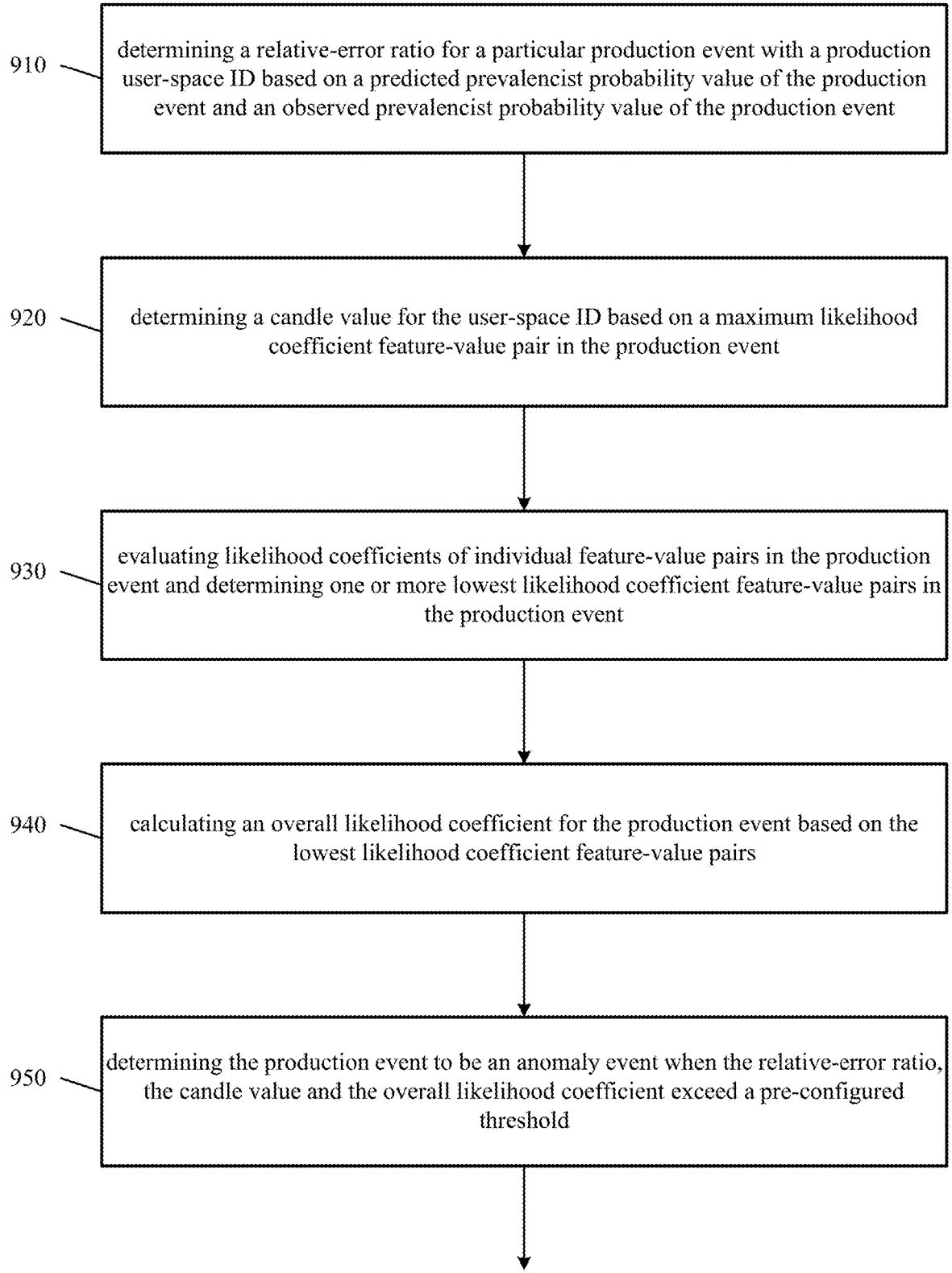
FIG. 9 shows one implementation of a flowchart of detecting anomalies based on activity models learned using machine learning.

FIG. 9 shows one implementation of a flowchart 900 of detecting anomalies based on activity models learned using machine learning. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

At action 910, a relative-error ratio is determined for a particular production event with a production space ID based on a predicted prevalencist probability value of the production event and an observed prevalencist probability value of the production event.

At action 920, a standard candle value for the space ID is determined based on a maximum likelihood coefficient feature-value pair in the production event.

At action 930, likelihood coefficients of individual feature-value pairs in the production event are evaluated and one or more lowest likelihood coefficient feature-value pairs in the production event are determined.

At action 940, an overall likelihood coefficient for the production event is calculated based on the lowest likelihood coefficient feature-value pairs.

At action 950, the production event is determined to be an anomaly event when the relative-error ratio, the standard candle value and the overall likelihood coefficient exceed a threshold. In one implementation, the threshold is pre-configured by a system administrator. In some implementations, the threshold is dynamic, self-adaptive and model-based such that if a given tenant registers significant amount of anomalies, then the threshold is automatically adopted or tuned to decrease the anomaly count. In other implementations, the threshold is automatically adopted or tuned to increase the anomaly count when a given tenant registers too few anomalies.

Figure 10:
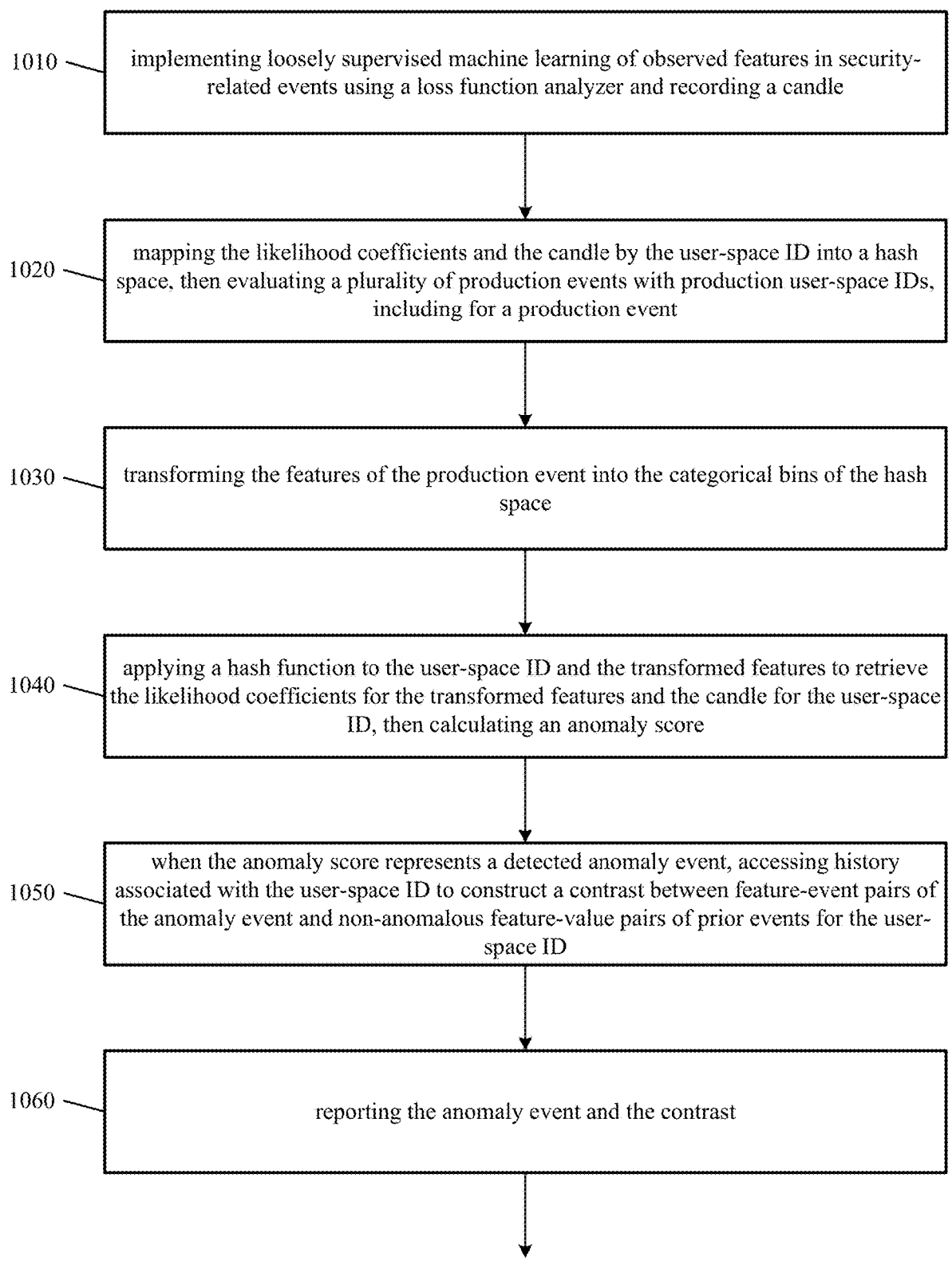
FIG. 10 illustrates one implementation of a representative method of detecting an anomaly event that has not frequently been observed in an ongoing event stream of security-related events of one or more organizations.

FIG. 10 illustrates one implementation of a representative method 1000 of detecting an anomaly event that has not frequently been observed in an ongoing event stream of security-related events of one or more organizations. Flowchart 1000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

At action 1010, loosely supervised machine learning of observed features in security-related events is implemented using a loss function analyzer and recording a standard candle. This includes transforming training events by assigning the features into categorical bins and coding the assigned features with a Boolean value as present in their respective categorical bins, analyzing the transformed training events using the loss function analyzer, treating the events as having occurred with certainty, requiring the loss function analyzer to analyze the events by a space identifier (ID), requiring the loss function analyzer to fit the transformed features essentially through an origin, and producing likelihood coefficients calculated by the space ID and the standard candle At action 1020, the likelihood coefficients and the standard candle by the space ID mapped into a hash-space. Further, a plurality of production events with production space IDs is evaluated.

At action 1030, for a production event, the features of the production event are transformed into the categorical bins of the hash-space.

At action 1040, a hash function is applied to the space ID and the transformed features to retrieve the likelihood coefficients for the transformed features and the standard candle for the space ID. Further, an anomaly score is calculated based on the hash function.

At action 1050, when the anomaly score represents a detected anomaly event, history associated with the space ID is accessed to construct a contrast between feature-event pairs of the anomaly event and non-anomalous feature-value pairs of prior events for the space ID.

At action 1060, the anomaly event and the contrast are reported.

FIG. 11 shows one implementation of a flowchart 1100 of detecting an anomaly event that has not frequently been observed in an ongoing event stream of security-related events of one or more organizations. Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

At action 1110, a compressed set of stored likelihood coefficients and stored standard candles for a plurality of users into expanded a hash-space.

At action 1120, a security-related event is received that includes a space identifier (ID) and features with certain values.

At action 1130, the feature-value pairs are transformed into categorical bins of the hash-space.

At action 1140, a hash function is applied to a combination of the space ID and the transformed feature-value pairs to retrieve the likelihood coefficients for the transformed feature-value pairs and the standard candle for the space ID.

At action 1150, the likelihood coefficients and any transformed feature-value pairs that do not have likelihood coefficients because they were not previously observed for the space ID are scored, in combination with evaluation of the standard candle, to produce an anomaly score.

At action 1160, when the anomaly score represents a detected anomaly event, history associated with the space ID is accessed to construct a contrast between feature-event pairs of the anomaly event and non-anomalous feature-value pairs of prior events for the space ID.

At action 1170, the anomaly event and the contrast are reported.

Computer System

Figure 12:
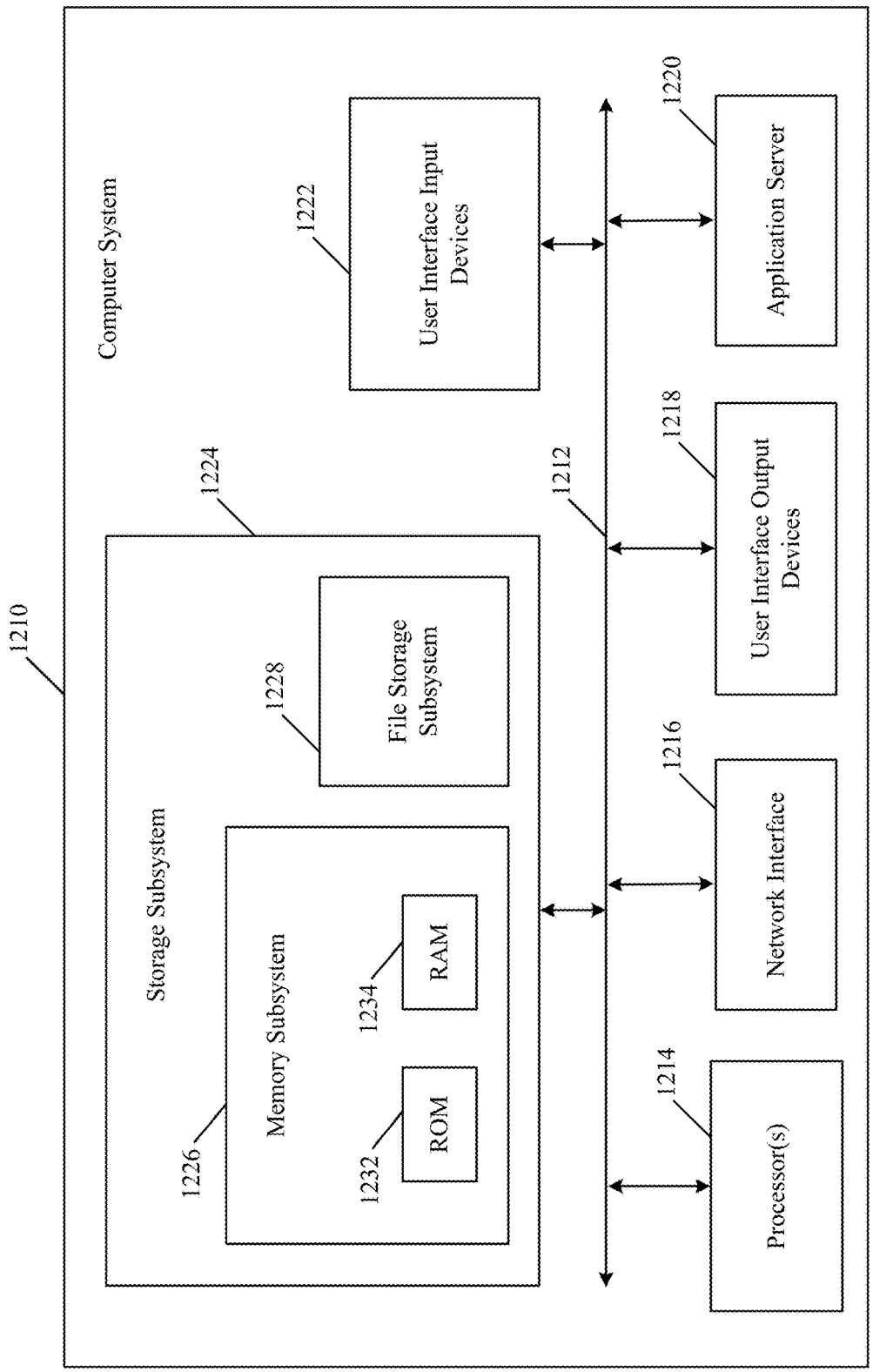
FIG. 12 is a block diagram of an example computer system used to generate anomalies using machine learning based anomaly detection.

FIG. 12 is a block diagram of an example computer system 1200 used to generate anomalies using machine learning based anomaly detection. Computer system 1210 typically includes at least one processor 1214 that communicates with a number of peripheral devices via bus subsystem 1212. These peripheral devices can include a storage subsystem 1224 including, for example, memory devices and a file storage subsystem 1228, user interface input devices 1222, user interface output devices 1218, and a network interface subsystem 1216. The input and output devices allow user interaction with computer system 1210. Network interface subsystem 1216 provides an interface to outside networks, including an interface to corresponding interface devices in other computer systems.

User interface input devices 1222 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1210.

User interface output devices 1218 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1210 to the user or to another machine or computer system.

Storage subsystem 1224 stores programming and data constructs that provide the functionality of some or all of the modules and methods described herein. These software modules are generally executed by processor 1214 alone or in combination with other processors.

Memory 1226 used in the storage subsystem can include a number of memories including a main random access memory (RAM) 1234 for storage of instructions and data during program execution and a read only memory (ROM) 1232 in which fixed instructions are stored. A file storage subsystem 1228 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1228 in the storage subsystem 1224, or in other machines accessible by the processor.

Bus subsystem 1212 provides a mechanism for letting the various components and subsystems of computer system 1210 communicate with each other as intended. Although bus subsystem 1212 is shown schematically as a single bus, alternative implementations of the bus subsystem can use multiple busses. Application server 1220 can be a framework that allows the applications of computer system 1200 to run, such as the hardware and/or software, e.g., the operating system.

Computer system 1210 can be of varying types including a workstation, server, computing cluster, blade server, server farm, or any other data processing system or computing device. Due to the ever-changing nature of computers and networks, the description of computer system 1210 depicted in FIG. 12 is intended only as one example. Many other configurations of computer system 1210 are possible having more or fewer components than the computer system depicted in FIG. 12.

CONCLUSION AND PARTICULAR IMPLEMENTATIONS

In one implementation, a method is described of initializing an anomaly detector that handles an event stream of security-related events of one or more organizations. The method includes feeding, to an online machine learner, a stream of security-related events that are labeled with at least one space identifier (ID) and that include features with certain values. It includes transforming the events by assigning feature-value pairs into categorical bins having coverage such that at least a majority of the assignments, for example, 55 percent, 60 percent, 70 percent, or 90 percent of the assignments, during training period end up in categorical bins that cover at least two feature instances and coding the assigned feature-value pairs with a Boolean value as present in their respective categorical bins. It further includes analyzing the stream of transformed events using a loss function analyzer of the online machine learner by grouping transformed events in the stream into sub-streams by space ID and separately analyzing the sub-streams in the loss function analyzer, requiring the loss function analyzer to correlate, essentially through an origin, coded feature-value pairs in categorical bins of a given sub-stream with a target feature artificially labeled as a constant, calculating likelihood coefficients for the coded feature-value pairs based on the correlation, indicative of a probability of the features having the values in the sub-stream, using the likelihood coefficients to determine prevalencist probability values for corresponding events that include the coded features-value pairs, indicative of an occurrence frequency of the corresponding events in the sub-stream, and storing the likelihood coefficients and the probability values by space ID and supplying the likelihood coefficients and the probability values to an anomaly detector for initialization of the anomaly detector.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as online machine learner, security-related events, standard candle feature, space ID, transformation, anomaly detection loop, network security system, deep API inspection (DAPII), data mining and anomaly detection, and conclusion and particular implementations, etc.

In one implementation, the method includes annotating the events with prevalencist probability values of about 0.1 to 1.0, indicative of an occurrence frequency of the events. In one implementation, the loss function analyzer is a stochastic gradient descent (SGD) analyzer.

In some implementations, the method includes storing the likelihood coefficients annotated with corresponding coded feature-value pairs in respective slots of a hash-space and retrieving the likelihood coefficients for anomaly detection by applying a hash function to the coded feature-value pairs.

In some implementations, the security-related events include connection events and application events.

In one implementation, the method includes accumulating non-zero likelihood coefficients for frequently appearing feature-value pairs, updating likelihood coefficients of individual feature-value pairs during the correlation, and converging over time the likelihood coefficients of the frequently appearing feature-value pairs to match likelihood coefficients of the target feature.

In one implementation, the method includes learning user-specific activity habits based on the separate analysis of the sub-streams by the space ID and persisting in a hash-space separate user-states based on the learned user-specific activity habits, representing occurrence frequencies of all past events for individual users.

In one implementation, a prevalencist probability value of 0 indicates previously unseen events. In another implementation, a prevalencist probability value of 1 indicates frequently appearing events.

In some implementation, the method includes storing the likelihood coefficients and the probability values for multiple space IDs of an organization in a hash-space as a tenant activity model, indicative of activity habits of users in the organization and updating the tenant activity model with new events to incorporate changes to the activity habits.

In some implementation, the method includes storing the likelihood coefficients and the probability values for a particular space ID in a hash-space as a user activity model, indicative of activity habits of a user and updating the user activity model with new events to incorporate changes to the activity habits.

In one implementation, the method includes determining a relative-error ratio for a particular production event with a production space ID based on a predicted prevalencist probability value of the production event and an observed prevalencist probability value of the production event, determining a standard candle value for the space ID based on a maximum likelihood coefficient feature-value pair in the production event, evaluating likelihood coefficients of individual feature-value pairs in the production event and determining one or more lowest likelihood coefficient feature-value pairs in the production event, calculating an overall likelihood coefficient for the production event based on the lowest likelihood coefficient feature-value pairs, and determining the production event to be an anomaly event when the relative-error ratio, the standard candle value and the overall likelihood coefficient exceed a threshold.

The method also includes distinguishing between a seasoned user and an unseasoned user by requiring initialization and analysis of a space ID by the loss function analyzer with a standard candle value and maturing the standard candle value of the space ID to a target value responsive to a threshold number of events received for the space ID. In one implementation, seasoned space IDs have non-zero standard candle values and unseasoned space IDs have near-zero standard candle values. In another implementation, the method includes clustering a plurality of production events with lowest likelihood coefficient feature-value pairs based on a feature-dimension type and generating for display clustered productions events for different feature-dimension types.

The method also includes updating tenant and user activity models over time, including maturing and storing frequently occurring anomalous events as normal user activity.

In one implementation, the online machine learner is an online streaming processor that learns features for 5,000 to 50,000 security-related events per second per hardware node. In another implementation, the online machine learner is an online streaming processor that processes 50,000 to 5 million features per second per hardware node.

In one implementation, the features include one or more time dimensions, a source location dimension, a source Internet Protocol (IP) address dimension, a destination location dimension, a destination IP address dimension, and a source device identity dimension. In another implementation, the features include an application used dimension, an activity type and detail dimension, and a manipulated object dimension.

The method also includes assigning time-based features of the events into multiple sets of periodic bins with varying granularity. The method further includes assigning the time-based features into at least one day-of-week periodic bin with 7 distinct values, time-of-day periodic bin with 24 distinct values, and time-of-day periodic bin with 24 distinct values.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In another implementation, described is a method of detecting an anomaly event that has not frequently been observed in an ongoing event stream of security-related events of one or more organizations. The method includes implementing loosely supervised machine learning of observed features in security-related events using a loss function analyzer and recording a standard candle by transforming training events by assigning the features into categorical bins and coding the assigned features with a Boolean value as present in their respective categorical bins, analyzing the transformed training events using the loss function analyzer, treating the events as having occurred with certainty, requiring the loss function analyzer to analyze the events by a space identifier (ID), and requiring the loss function analyzer to fit the transformed features essentially through an origin, producing likelihood coefficients calculated by the space ID and the standard candle, mapping the likelihood coefficients and the standard candle by the space ID into a hash-space, then evaluating a plurality of production events with production space IDs, including for a production event transforming the features of the production event into the categorical bins of the hash-space, applying a hash function to the space ID and the transformed features to retrieve the likelihood coefficients for the transformed features and the standard candle for the space ID, then calculating an anomaly score, when the anomaly score represents a detected anomaly event, accessing history associated with the space ID to construct a contrast between feature-event pairs of the anomaly event and non-anomalous feature-value pairs of prior events for the space ID, and reporting the anomaly event and the contrast.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as online machine learner, security-related events, standard candle feature, space ID, transformation, anomaly detection loop, network security system, deep API inspection (DAPII), data mining and anomaly detection, and conclusion and particular implementations, etc.

The method also includes generating for display the anomaly event in naturally processed language. It further includes storing a set of coded feature-value pairs and corresponding likelihood coefficients on disk using a dense feature representation and storing the set on memory using a sparse feature representation.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In yet another implementation, described is a method of detecting anomalies in an event stream of security-related events of one or more organizations. The method includes expanding a compressed set of stored likelihood coefficients and stored standard candles for a plurality of users into a hash-space, receiving a security-related event that includes a space identifier (ID) and features with certain values, transforming the feature-value pairs into categorical bins of the hash-space, applying a hash function to a combination of the space ID and the transformed feature-value pairs to retrieve the likelihood coefficients for the transformed feature-value pairs and the standard candle for the space ID, scoring the likelihood coefficients and any transformed feature-value pairs that do not have likelihood coefficients because they were not previously observed for the space ID, in combination with evaluating the standard candle, to produce an anomaly score, when the anomaly score represents a detected anomaly event, accessing history associated with the space ID to construct a contrast between feature-event pairs of the anomaly event and non-anomalous feature-value pairs of prior events for the space ID, and reporting the anomaly event and the contrast.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of responding to a detected anomaly event that has not frequently been observed in an ongoing event stream of security-related events of one or more organizations, the method including:
   obtaining an evaluation of a plurality of production events with production space IDs, wherein the evaluation has been prepared for a production event by:
      transforming features of the production event into categorical bins of a hash-space;
      applying a hash function to the production space ID and the features of the production event as transformed to retrieve likelihood coefficients for the transformed features of the production event and a standard candle for the production space ID;
      calculating an anomaly score; and
      when the anomaly score represents a detected anomaly event, accessing history associated with the production space ID to construct a contrast between feature-event pairs of the detected anomaly event and non-anomalous feature-value pairs of prior events for the production space ID; and
   based upon the evaluation as obtained, invoking one or more security actions including at least one of a quarantine, and an encryption, to be performed when at least one detected anomaly event is represented in the evaluation as obtained;
wherein the likelihood coefficients had been calculated by space ID and a standard candle and mapped into the hash-space using a loosely supervised machine learning of observed features in security-related events using a loss function analyzer and recording the standard candle.

2. The method of claim 1, wherein the loosely supervised machine learning of observed features in security-related events using a loss function analyzer and recording a standard candle, further includes:
transforming training events by assigning the observed features into categorical bins and coding assigned observed features with a Boolean value as present in their respective categorical bins; and
analyzing transformed training events using the loss function analyzer, treating the security-related events as having occurred with certainty, requiring the loss function analyzer to analyze the security-related events by a space identifier (ID), and requiring the loss function analyzer to fit the observed features as transformed essentially through an origin.

3. The method of claim 1, further including generating for display the anomaly event in naturally processed language.

4. The method of claim 1, further including:
storing a set of coded feature-value pairs and corresponding likelihood coefficients in a persistent storage using a dense feature representation; and
storing the set of coded feature-value pairs and corresponding likelihood coefficients on memory using a sparse feature representation.

5. The method of claim 1, wherein the loss function analyzer is a stochastic gradient descent (SGD) analyzer.

6. The method of claim 1, wherein events are annotated with prevalencist probability values of between 0 to 1, indicative of an occurrence frequency of the events.

7. The method of claim 6, wherein a prevalencist probability value of 0 indicates previously unseen events.

8. The method of claim 6, wherein a prevalencist probability value of 1 indicates frequently appearing events.

9. The method of claim 6, further including:
storing the likelihood coefficients and prevalencist probability values for multiple space IDs of an organization in a hash-space as a tenant activity model, indicative of activity habits of users in the organization; and
updating the tenant activity model with new events to incorporate changes to one or more activity habits.

10. The method of claim 6, further including:
storing the likelihood coefficients and prevalencist probability values for a particular space ID in a hash-space as a user activity model, indicative of activity habits of a user; and
updating the user activity model with new events to incorporate changes to one or more activity habits.

11. The method of claim 6, further including:
determining a relative-error ratio for a particular production event with a production space ID based on a predicted prevalencist probability value of the particular production event and an observed prevalencist probability value of the particular production event;
determining a standard candle value for the production space ID based on a maximum likelihood coefficient feature-value pair in the particular production event;
evaluating likelihood coefficients of individual feature-value pairs in the particular production event and determining one or more lowest likelihood coefficient feature-value pairs in the particular production event;
calculating an overall likelihood coefficient for the particular production event based on the one or more lowest likelihood coefficient feature-value pairs; and
determining the particular production event to be an anomaly event when the relative-error ratio, the standard candle value and the overall likelihood coefficient exceed a threshold.

12. The method of claim 11, further including distinguishing between a seasoned user and an unseasoned user by:
requiring initialization and analysis of a space ID by the loss function analyzer with the standard candle value; and
maturing the standard candle value of the production space ID to a target value responsive to a threshold number of events received for the space ID, wherein seasoned space IDs have non-zero standard candle values.

13. The method of claim 11, further including:
clustering a plurality of production events with lowest likelihood coefficient feature-value pairs based on a feature-dimension type; and
generating for display clustered productions events for different feature-dimension types.

14. The method of claim 1, further including updating tenant and user activity models over time, including maturing and storing frequently occurring anomalous events as normal user activity.

15. A method of responding to detected anomalies in an event stream of security-related events of one or more organizations, the method including:
obtaining an evaluation of a received security-related event that includes a space identifier (ID) and features with certain values; wherein the evaluation has been prepared by:
transforming feature-value pairs into categorical bins of a hash-space;
applying a hash function to a combination of the space ID and the transformed feature-value pairs to retrieve likelihood coefficients for the transformed feature-value pairs and a standard candle for the space ID;
scoring the likelihood coefficients and any transformed feature-value pairs that do not have likelihood coefficients because the transformed feature-value pairs that do not have likelihood coefficients were not previously observed for the space ID, in combination with evaluating the standard candle, to produce an anomaly score; and
when the anomaly score represents a detected anomaly event, accessing history associated with the space ID to construct a contrast between feature-event pairs of the detected anomaly event and non-anomalous feature-value pairs of prior security-related events for the space ID; and
based upon the evaluation as obtained, invoking one or more security actions including at least one of a quarantine, and an encryption, to be performed when at least one detected anomaly event is represented in the evaluation as obtained.

16. The method of claim 15, wherein a compressed set of stored likelihood coefficients and stored standard candles for a plurality of users has been expanded into a hash-space.

17. A non-transitory computer readable storage medium impressed with computer program instructions to respond to a detected anomaly event that has not frequently been observed in an ongoing event stream of security-related events of one or more organizations, which computer program instructions, when executed on a processor, implement a method comprising:

obtaining an evaluation of a plurality of production events with production space IDs, wherein the evaluation has been prepared for a production event by:
  transforming features of the production event into categorical bins of a hash-space;
  applying a hash function to the production space ID and the features of the production event as transformed to retrieve likelihood coefficients for the transformed features of the production event and a standard candle for the production space ID;
  calculating an anomaly score; and
  when the anomaly score represents a detected anomaly event, accessing history associated with the production space ID to construct a contrast between feature-event pairs of the detected anomaly event and non-anomalous feature-value pairs of prior events for the production space ID; and
based upon the evaluation as obtained, invoking one or more security actions including at least one of a quarantine, and an encryption, to be performed when at least one detected anomaly event is represented in the evaluation as obtained;

wherein the likelihood coefficients had been calculated by space ID and a standard candle and mapped into the hash-space using a loosely supervised machine learning of observed features in security-related events using a loss function analyzer and recording the standard candle.

18. A non-transitory computer readable storage medium impressed with computer program instructions to respond to detected anomalies in an event stream of security-related events of one or more organizations, which computer program instructions, when executed on a processor, implement the method of claim 15.

19. A system including one or more processors coupled to memory loaded with computer instructions, which computer instructions, when executed on the processors, implement the method of claim 1.

20. A system including one or more processors coupled to memory loaded with computer instructions, which computer instructions, when executed on the processors, implement the method of claim 15.

* * * * *